US008370185B2

(12) United States Patent
Fotteler et al.

(10) Patent No.: US 8,370,185 B2
(45) Date of Patent: Feb. 5, 2013

(54) SYSTEM AND METHOD FOR PERFORMING ASSORTMENT PLANNING

(75) Inventors: Christine Fotteler, Winnetka, IL (US); Klaus Kopecz, Walldorf (DE); Hergen Busch, Chicago, IL (US)

(73) Assignee: SAP Aktiengesellschaft, Walldorf (DE)

( * ) Notice: Subject to any disclaimer, the term of this patent is extended or adjusted under 35 U.S.C. 154(b) by 1446 days.

(21) Appl. No.: 10/911,226

(22) Filed: Aug. 4, 2004

(65) Prior Publication Data

US 2005/0197850 A1  Sep. 8, 2005

Related U.S. Application Data

(63) Continuation of application No. 10/910,783, filed on Aug. 2, 2004, now Pat. No. 7,788,124, which is a continuation of application No. 10/898,892, filed on Jul. 26, 2004, now Pat. No. 7,752,067, which is a continuation-in-part of application No. 10/886,260, (Continued)

(51) Int. Cl.
*G06Q 10/00* (2012.01)
(52) U.S. Cl. .......................................... 705/7.12; 705/28
(58) Field of Classification Search ..................... None
See application file for complete search history.

(56) References Cited

U.S. PATENT DOCUMENTS

| | | | |
|---|---|---|---|
| 4,752,877 A | 6/1988 | Roberts et al. | |
| 5,015,190 A | 5/1991 | Fowlkes, Jr. | |
| 5,315,508 A | 5/1994 | Bain et al. | |
| 5,400,253 A | 3/1995 | O'Connor | |
| 5,450,317 A | 9/1995 | Lu et al. | |
| 5,615,109 A | 3/1997 | Eder | |
| 5,758,327 A | 5/1998 | Gardner et al. | |
| 5,832,456 A | 11/1998 | Fox et al. | |
| 5,870,716 A | 2/1999 | Sugiyama et al. | |
| 5,930,771 A | 7/1999 | Stapp | |
| 5,953,707 A | 9/1999 | Huang et al. | |
| 5,999,914 A | 12/1999 | Blinn et al. | |
| 6,006,196 A * | 12/1999 | Feigin et al. | 705/7.31 |
| 6,009,407 A | 12/1999 | Garg | |
| 6,029,139 A | 2/2000 | Cunningham et al. | |
| 6,064,984 A | 5/2000 | Ferguson et al. | |
| 6,078,891 A * | 6/2000 | Riordan et al. | 705/10 |
| 6,151,582 A | 11/2000 | Huang et al. | |

(Continued)

FOREIGN PATENT DOCUMENTS

| | | |
|---|---|---|
| JP | 2004-030343 A | 1/2004 |
| WO | WO 99/45450 A2 | 9/1999 |

(Continued)

OTHER PUBLICATIONS

SAP Retail Release 4.6C (2001). User's Guide.*

(Continued)

*Primary Examiner* — Romain Jeanty
*Assistant Examiner* — Brett Feeney
(74) *Attorney, Agent, or Firm* — Foley & Lardner, LLP

(57) ABSTRACT

A system, method and program product are provided for performing assortment definition/planning (i.e., matching the right articles with the right stores at the right times). The method comprises assigning a first article to the assortment via a first intermediate link, and assigning a first validity period to the first intermediate link to determine a first time period during which the first article is in the assortment.

18 Claims, 15 Drawing Sheets

Related U.S. Application Data filed on Jul. 6, 2004, said application No. 10/910,783 is a continuation of application No. 10/899,385, filed on Jul. 26, 2004, which is a continuation-in-part of application No. 10/886,260, filed on Jul. 6, 2004.

(60) Provisional application No. 60/551,221, filed on Mar. 8, 2004, provisional application No. 60/563,284, filed on Apr. 16, 2004.

(56) References Cited

U.S. PATENT DOCUMENTS

| | | | |
|---|---|---|---|
| 6,167,380 A | 12/2000 | Kennedy et al. | |
| 6,260,024 B1 | 7/2001 | Shkedy | |
| 6,341,351 B1 | 1/2002 | Muralidhran et al. | |
| 6,366,890 B1* | 4/2002 | Usrey | 705/10 |
| 6,442,528 B1 | 8/2002 | Notani et al. | |
| 6,493,678 B1 | 12/2002 | Foster et al. | |
| 6,505,093 B1 | 1/2003 | Thatcher et al. | |
| 6,507,851 B1 | 1/2003 | Fujiwara et al. | |
| 6,510,420 B1* | 1/2003 | Cessna et al. | 706/45 |
| 6,578,009 B1 | 6/2003 | Shinozaki | |
| 6,584,447 B1 | 6/2003 | Fox et al. | |
| 6,597,379 B1* | 7/2003 | Morris et al. | 715/781 |
| 6,701,299 B2 | 3/2004 | Kraisser et al. | |
| 6,711,550 B1 | 3/2004 | Lewis et al. | |
| 6,725,204 B1 | 4/2004 | Gusley | |
| 6,868,528 B2 | 3/2005 | Roberts | |
| 6,910,017 B1 | 6/2005 | Woo et al. | |
| 6,954,736 B2 | 10/2005 | Menninger et al. | |
| 6,980,966 B1 | 12/2005 | Sobrado et al. | |
| 6,988,104 B2 | 1/2006 | Kootale | |
| 7,006,981 B2* | 2/2006 | Rose et al. | 705/10 |
| 7,069,232 B1 | 6/2006 | Fox et al. | |
| 7,080,026 B2 | 7/2006 | Singh et al. | |
| 7,080,030 B2 | 7/2006 | Eglen et al. | |
| 7,082,408 B1 | 7/2006 | Baumann et al. | |
| 7,092,896 B2* | 8/2006 | Delurgio et al. | 705/7.35 |
| 7,092,929 B1* | 8/2006 | Dvorak et al. | 705/28 |
| 7,103,560 B1 | 9/2006 | Fox et al. | |
| 7,117,165 B1 | 10/2006 | Adams et al. | |
| 7,124,098 B2 | 10/2006 | Hopson et al. | |
| 7,124,984 B2 | 10/2006 | Yokouchi et al. | |
| 7,130,811 B1 | 10/2006 | Delurgio et al. | |
| 7,137,566 B2* | 11/2006 | Silverbrook et al. | 235/494 |
| 7,139,731 B1 | 11/2006 | Alvin | |
| 7,155,402 B1* | 12/2006 | Dvorak | 705/10 |
| 7,171,376 B2* | 1/2007 | Ramakrishnan | 705/10 |
| 7,197,474 B1* | 3/2007 | Kitts | 705/7.31 |
| 7,213,037 B2 | 5/2007 | Rangadass | |
| 7,257,544 B2* | 8/2007 | Rose et al. | 705/10 |
| 7,295,990 B1* | 11/2007 | Braumoeller et al. | 705/7.31 |
| 7,310,646 B2* | 12/2007 | Rangadass et al. | 707/100 |
| 7,353,195 B2 | 4/2008 | Inoue et al. | |
| 7,370,364 B2* | 5/2008 | Dobbins et al. | 726/28 |
| 7,386,492 B2 | 6/2008 | Ginsburg et al. | |
| 7,386,519 B1 | 6/2008 | Delurgio et al. | |
| 7,467,098 B2 | 12/2008 | Razumov | |
| 7,523,048 B1* | 4/2009 | Dvorak | 705/10 |
| 7,552,066 B1 | 6/2009 | Landvater | |
| 7,689,460 B2 | 3/2010 | Natori et al. | |
| 7,805,383 B2* | 9/2010 | Veit et al. | 705/400 |
| 8,121,876 B1* | 2/2012 | Braumoeller et al. | 705/7.11 |
| 2001/0019778 A1 | 9/2001 | Gardaz et al. | |
| 2001/0032130 A1 | 10/2001 | Gabos et al. | |
| 2001/0039517 A1 | 11/2001 | Kawakatsu | |
| 2001/0047293 A1 | 11/2001 | Waller et al. | |
| 2001/0049634 A1 | 12/2001 | Stewart | |
| 2002/0013731 A1 | 1/2002 | Bright et al. | |
| 2002/0023500 A1 | 2/2002 | Chikuan et al. | |
| 2002/0026296 A1 | 2/2002 | Lohmann et al. | |
| 2002/0026368 A1 | 2/2002 | Carter, III | |
| 2002/0035537 A1 | 3/2002 | Waller et al. | |
| 2002/0042755 A1 | 4/2002 | Kumar et al. | |
| 2002/0059108 A1 | 5/2002 | Okura et al. | |
| 2002/0059122 A1* | 5/2002 | Inoue et al. | 705/29 |
| 2002/0066033 A1* | 5/2002 | Dobbins et al. | 713/201 |
| 2002/0072986 A1 | 6/2002 | Aram | |
| 2002/0073114 A1 | 6/2002 | Nicastro et al. | |
| 2002/0078159 A1 | 6/2002 | Petrogiannis et al. | |
| 2002/0087532 A1* | 7/2002 | Barritz et al. | 707/3 |
| 2002/0099597 A1* | 7/2002 | Gamage et al. | 705/10 |
| 2002/0099678 A1 | 7/2002 | Albright et al. | |
| 2002/0107713 A1 | 8/2002 | Hawkins | |
| 2002/0116241 A1 | 8/2002 | Sandhu et al. | |
| 2002/0120459 A1* | 8/2002 | Dick et al. | 705/1 |
| 2002/0120533 A1 | 8/2002 | Wiesenmaier | |
| 2002/0123930 A1 | 9/2002 | Boyd et al. | |
| 2002/0124109 A1* | 9/2002 | Brown | 709/246 |
| 2002/0133385 A1* | 9/2002 | Fox et al. | 705/7 |
| 2002/0138290 A1 | 9/2002 | Metcalfe et al. | |
| 2002/0147630 A1* | 10/2002 | Rose et al. | 705/10 |
| 2002/0147668 A1 | 10/2002 | Smith et al. | |
| 2002/0152128 A1 | 10/2002 | Walch et al. | |
| 2002/0165834 A1 | 11/2002 | Delurgio et al. | |
| 2002/0184116 A1 | 12/2002 | Tam et al. | |
| 2003/0018513 A1 | 1/2003 | Hoffman et al. | |
| 2003/0023500 A1 | 1/2003 | Boies et al. | |
| 2003/0028393 A1 | 2/2003 | Coulston et al. | |
| 2003/0028437 A1 | 2/2003 | Grant et al. | |
| 2003/0046120 A1 | 3/2003 | Hoffman et al. | |
| 2003/0046195 A1 | 3/2003 | Mao | |
| 2003/0050852 A1 | 3/2003 | Liao et al. | |
| 2003/0050869 A1 | 3/2003 | Bruynsteen | |
| 2003/0061081 A1* | 3/2003 | Kellond et al. | 705/7 |
| 2003/0074269 A1 | 4/2003 | Viswanath | |
| 2003/0083925 A1* | 5/2003 | Weaver et al. | 705/10 |
| 2003/0110052 A1 | 6/2003 | Capazario et al. | |
| 2003/0126024 A1 | 7/2003 | Crampton et al. | |
| 2003/0130883 A1 | 7/2003 | Schroeder et al. | |
| 2003/0130905 A1 | 7/2003 | Foster et al. | |
| 2003/0144916 A1 | 7/2003 | Mumm et al. | |
| 2003/0149631 A1 | 8/2003 | Crampton et al. | |
| 2003/0149674 A1 | 8/2003 | Good et al. | |
| 2003/0154141 A1 | 8/2003 | Capazario et al. | |
| 2003/0158791 A1 | 8/2003 | Gilberto et al. | |
| 2003/0171978 A1 | 9/2003 | Jenkins et al. | |
| 2003/0171979 A1* | 9/2003 | Jenkins | 705/10 |
| 2003/0171998 A1 | 9/2003 | Pujar et al. | |
| 2003/0172007 A1 | 9/2003 | Helmolt et al. | |
| 2003/0187665 A1 | 10/2003 | Boyd | |
| 2003/0195791 A1 | 10/2003 | Waller et al. | |
| 2003/0195810 A1 | 10/2003 | Raghupathy et al. | |
| 2003/0200129 A1 | 10/2003 | Klaubauf et al. | |
| 2003/0200148 A1* | 10/2003 | Razumov | 705/26 |
| 2003/0200150 A1 | 10/2003 | Westcott et al. | |
| 2003/0208365 A1 | 11/2003 | Avery et al. | |
| 2003/0216969 A1 | 11/2003 | Bauer et al. | |
| 2003/0229502 A1 | 12/2003 | Woo | |
| 2004/0002912 A1 | 1/2004 | Colon et al. | |
| 2004/0010463 A1 | 1/2004 | Hahn-Carlson et al. | |
| 2004/0098358 A1 | 5/2004 | Roediger | |
| 2004/0122689 A1 | 6/2004 | Dailey et al. | |
| 2004/0162763 A1 | 8/2004 | Hoskin et al. | |
| 2004/0172321 A1 | 9/2004 | Vemula et al. | |
| 2004/0177075 A1* | 9/2004 | Rangadass | 707/10 |
| 2004/0186765 A1 | 9/2004 | Kataoka | |
| 2004/0186783 A1 | 9/2004 | Knight et al. | |
| 2004/0210489 A1 | 10/2004 | Jackson et al. | |
| 2004/0215662 A1* | 10/2004 | Rangadass | 707/104.1 |
| 2004/0220861 A1 | 11/2004 | Morciniec et al. | |
| 2004/0249699 A1* | 12/2004 | Laurent et al. | 705/10 |
| 2004/0254950 A1 | 12/2004 | Musgrove et al. | |
| 2004/0267674 A1 | 12/2004 | Feng et al. | |
| 2004/0267676 A1 | 12/2004 | Feng et al. | |
| 2005/0004831 A1* | 1/2005 | Najmi et al. | 705/10 |
| 2005/0015303 A1 | 1/2005 | Dubin et al. | |
| 2005/0021541 A1* | 1/2005 | Rangadass et al. | 707/100 |
| 2005/0055283 A1 | 3/2005 | Zarovinsky | |
| 2005/0060270 A1 | 3/2005 | Ramakrishnan | |
| 2005/0075915 A1 | 4/2005 | Clarkson | |
| 2005/0075941 A1 | 4/2005 | Jetter et al. | |
| 2005/0086122 A1 | 4/2005 | Cirulli et al. | |
| 2005/0086125 A1 | 4/2005 | Cirulli et al. | |

| | | | |
|---|---|---|---|
| 2005/0096122 A1 | 5/2005 | Nireki et al. | |
| 2005/0096963 A1 | 5/2005 | Myr et al. | |
| 2005/0102175 A1 | 5/2005 | Dudat et al. | |
| 2005/0102192 A1 | 5/2005 | Gerrits et al. | |
| 2005/0102227 A1 | 5/2005 | Solonchev | |
| 2005/0165659 A1 | 7/2005 | Gruber | |
| 2005/0171825 A1 | 8/2005 | Denton et al. | |
| 2005/0189414 A1* | 9/2005 | Fano et al. | 235/383 |
| 2005/0197849 A1 | 9/2005 | Fotteler et al. | |
| 2005/0197850 A1 | 9/2005 | Fotteler et al. | |
| 2005/0197872 A1 | 9/2005 | Fotteler et al. | |
| 2005/0197878 A1 | 9/2005 | Fotteler et al. | |
| 2005/0197881 A1 | 9/2005 | Fotteler et al. | |
| 2005/0197882 A1 | 9/2005 | Fotteler et al. | |
| 2005/0197887 A1 | 9/2005 | Zuerl et al. | |
| 2005/0197918 A1 | 9/2005 | Wittmer et al. | |
| 2005/0197928 A1 | 9/2005 | Fotteler et al. | |
| 2005/0197972 A1* | 9/2005 | Kettner et al. | 705/400 |
| 2005/0205670 A1 | 9/2005 | Natori et al. | |
| 2005/0209900 A1 | 9/2005 | Kettner et al. | |
| 2005/0216371 A1 | 9/2005 | Fotteler et al. | |
| 2005/0234762 A1 | 10/2005 | Pinto et al. | |
| 2005/0235020 A1 | 10/2005 | Gabelmann et al. | |
| 2005/0240469 A1* | 10/2005 | Rose et al. | 705/10 |
| 2006/0015415 A1 | 1/2006 | Najmi | |
| 2006/0020512 A1 | 1/2006 | Lucas et al. | |
| 2006/0036507 A1 | 2/2006 | Pujar et al. | |
| 2006/0112099 A1 | 5/2006 | Musgrove et al. | |
| 2006/0149634 A1 | 7/2006 | Pelegrin et al. | |
| 2006/0265287 A1 | 11/2006 | Kubo | |
| 2007/0027745 A1 | 2/2007 | Ouimet | |
| 2007/0050272 A1 | 3/2007 | Godlewski et al. | |
| 2007/0177211 A1 | 8/2007 | Eller et al. | |
| 2008/0120206 A1 | 5/2008 | Weiler et al. | |
| 2008/0319857 A1* | 12/2008 | Dobbins et al. | 705/14 |
| 2009/0099879 A1 | 4/2009 | Ouimet | |
| 2009/0271245 A1 | 10/2009 | Joshi et al. | |
| 2010/0070333 A1 | 3/2010 | Musa | |
| 2010/0320109 A1 | 12/2010 | Trumbauer et al. | |

FOREIGN PATENT DOCUMENTS

WO        WO 01/71635 A2       9/2001

OTHER PUBLICATIONS

SAP Retail MAP (2003). Product Brochure.*
U.S. Appl. No. 60/374,892, filed Apr. 22, 2002, Krajec.
Abraham et al., "An Implemented System for Improving Promotion Productivity Using Store Scanner Data", Marketing Science, Summer 1993, vol. 12, No. 3, pp. 248-269.
Anon., "(A Lot of) Life After H. Ross: Electronic Data Systems", *Financial World*, vol. 162, No. 22, Nov. 9, 1993 (p. 50(2)).
"Beyond Markdown Management", summer/autumn 03, the 4caster, Issue 4, vol. 2, 4 pages.
Brown, "The Effects of Assortment Composition Flexibility on Operating Efficiency", (Abstract Only), *Dissertation Abstracts Int'l.*, vol. 55/08-A, available at least by 1994, (p. 2458).
"Retailers Manage Markdown Challenges Using i2 Solutions", Jan. 13, 2003, NRF 92nd Annual Convention & Expo, 2 pages.
Author unknown, "Staffware and Biomni Join Forces to Provide End-to-End E-Procurement Solution with Enhanced Workflow Capability: Self-Service Functionality will Enable Thousands of Transactions to be Handled Daily from the Desktop," M2 Presswire, Coventry, Feb. 6, 2001, 1 page.
Jensen et al., "Long-Term Construction Contracts: The Impact of Tamra '88 on Revenue Recognition", *Journal of Construction Education*, Spring 1997, vol. 2, No. 1, pp. 37-53.
Kelkar et al., Price Modeling in Standards for Electronic Product Catalogs Based on XML, 2002, pp. 366-375.
Melcher, "Local tech firm creates retail markdown tool", Mar. 24, 2000, Cincinnati Business Courier, 3 pages.
Profitlogic, available at http://webarchive.org/web/2002060311838/, available at least by Apr. 15, 2005, 22 pages.
Srinivasan et al., Concepts and strategy guidelines for designing value enhancing sales promotions, Journal of Product and Brand Management, vol. 7, No. 5, 1998, pp. 410-420.
Subrahmanyan et al., "Developing optimal pricing and inventory policies for retailers who face uncertain demand", Journal of Retailing, vol. 72, No. 1, Spring, 1996, 15 pages.
Wilson, "Changing the Process of Production", *Industrial Management*, vol. 37, No. 1, Jan./Feb. 1995 (pp. 1-2).
Notice of Allowance for U.S. Appl. No. 10/898,892, mail date Apr. 14, 2010, 6 pages.
Notice of Allowance for U.S. Appl. No. 10/910,783, mail date Apr. 15, 2010, 6 pages.
Office Action for U.S. Appl. No. 10/886,260, mail date Apr. 30, 2010, 27 pages.
Office Action for U.S. Appl. No. 10/899,385, mail date Sep. 7, 2010, 23 pages.
Office Action for U.S. Appl. No. 11/008,085, mail date Mar. 22, 2011, 16 pages.
Office Action for U.S. Appl. No. 11/008,085, mail date Oct. 5, 2010, 14 pages.
Office Action for U.S. Appl. No. 11/008,646, mail date Dec. 2, 2010, 9 pages.
Office Action for U.S. Appl. No. 11/028,485, mail date Apr. 6, 2011, 30 pages.
Guy CM (1998). Classifications of retail stores and shopping centres: some methodological issues. GeoJournal. 45: 255-264.
Office Action for U.S. Appl. No. 10/886,260, mail date Dec. 18, 2009, 21 pages.
Office Action for U.S. Appl. No. 10/886,260, mail date Dec. 8, 2008, 16 pages.
Office Action for U.S. Appl. No. 10/886,260, mail date Jul. 15, 2009, 21 pages.
Office Action for U.S. Appl. No. 10/898,892, mail date Apr. 9, 2009, 20 pages.
Office Action for U.S. Appl. No. 10/898,892, mail date Dec. 16, 2008, 14 pages.
Office Action for U.S. Appl. No. 10/898,892, mail date Dec. 17, 2009, 17 pages.
Office Action for U.S. Appl. No. 10/898,892, mail date Jul. 30, 2009, 19 pages.
Office Action for U.S. Appl. No. 10/899,385, mail date Aug. 4, 2009, 18 pages.
Office Action for U.S. Appl. No. 10/899,385, mail date Dec. 16, 2008, 19 pages.
Office Action for U.S. Appl. No. 10/899,385, mail date Jan. 27, 2010, 23 pages.
Office Action for U.S. Appl. No. 10/910,783, mail date Apr. 14, 2009, 24 pages.
Office Action for U.S. Appl. No. 10/910,783, mail date Oct. 26, 2009, 23 pages.
Office Action for U.S. Appl. No. 10/910,784, mail date Dec. 2, 2008, 17 pages.
Office Action for U.S. Appl. No. 10/911,226, mail date Sep. 8, 2009, 20 pages.
Office Action for U.S. Appl. No. 11/008,085, mail date Aug. 21, 2008, 11 pages.
Office Action for U.S. Appl. No. 11/008,085, mail date Mar. 2, 2010, 14 pages.
Office Action for U.S. Appl. No. 11/008,085, mail date Mar. 4, 2009, 16 pages.
Office Action for U.S. Appl. No. 11/008,085, mail date Sep. 30, 2009, 13 pages.
Office Action for U.S. Appl. No. 11/008,646, mail date Feb. 11, 2009, 10 pages.
Office Action for U.S. Appl. No. 11/008,646, mail date Mar. 23, 2010, 10 pages.
Office Action for U.S. Appl. No. 11/008,646, mail date Sep. 28, 2009, 10 pages.
Office Action for U.S. Appl. No. 11/028,485, mail date Feb. 19, 2010, 18 pages.
Office Action for U.S. Appl. No. 11/028,485, mail date Jul. 17, 2009, 15 pages.
Office Action for U.S. Appl. No. 11/028,485, mail date Mar. 23, 2009, 14 pages.
Office Action for U.S. Appl. No. 11/028,485, mail date Oct. 1, 2008, 13 pages.

SAP Retail Merchandise and Assortment Planning Jan. 9, 2003, 4 pages.

A guide to UK apparel retail pricing strategies: New approaches to pricing. Just-style: Aug. 2006, 4 pages.

Combining Horizontal and Vertical Analysis in Antitrust: Antitrust Bulletin: V49 N4 pp. 821-839, Winter 2004, 14 pages.

JC Penney to revise pricing methods and limit promotions. Stephanie Clifford. New York Times. Jan. 26, 2012, 4 pages.

Keebler Sharpens Demand Planning Processes With MySAP Supply Chain Management: Business Wire New York, Apr. 19, 2001, 3 pages.

Notice of Allowance for U.S. Appl. No. 11/028,485, mail date Sep. 28, 2011, 18 pages.

Notice of Allowance on U.S. Appl. No. 11/008,085, mail date Jun. 7, 2012, 13 pages.

Office Action on U.S. Appl. No. 10/899,385 mail date Feb. 28, 2012, 23 pages.

Office Action on U.S. Appl. No. 11/008,085, mail date Aug. 5, 2011, 18 pages.

Office Action on U.S. Appl. No. 11/008,085, mail date Feb. 2, 2012, 17 pages.

SAP Announces Advanced Forecasting and Replenishment, Business Editors Retail Systems 2002 Conference: Business Wire New York, Jun. 25, 2002, 2 pages.

The Science of pricing—but not the art of it. Alastair Dryburgh. management Today. London: Nov. 2011, 3 pages.

Notice of Allowance on U.S. Appl. No. 10/886,260, mail date Jul. 12, 2012, 26 pages.

Notice of Allowance on U.S. Appl. No. 10/899,385, mail date Jul. 11, 2012, 22 pages.

* cited by examiner

| TDR | TM | Reference article | TDR Cap. in pcs | Assigned IDR | IDR Cap. in pcs | Capacity index |
|---|---|---|---|---|---|---|
| Ty. 1111a | Suitcases | Shell type | 20 pcs per TDR | Ty. 1111a | 25 pcs per IDR | 1.25 |
| | | | | Ty. 1111b | 30 pcs per IDR | 1.50 |
| | | | | Ty. 1111c | 10 pcs per IDR | 0.50 |
| | | | | Ty. 1111d | 15 pcs per IDR | 0.75 |
| | | | | Ty. 1111e | 25 pcs per IDR | 1.25 |
| | | | | Ty. 1111f | 25 pcs per IDR | 1.25 |
| | | | | Ty. 1111g | 40 pcs per IDR | 2.00 |
| | | | | Ty. 1111h | 22 pcs per IDR | 1.10 |
| Ty. 1112a | Wallets | Std. wallet | 400 pcs per TDR | Ty. 1112a | 500 pcs per IDR | 1.25 |
| | | | | Ty. 1112b | 540 pcs per IDR | 1.35 |
| | | | | Ty. 1112c | 250 pcs per IDR | 0.63 |
| | | | | Ty. 1112d | 200 pcs per IDR | 0.50 |
| | | | | Ty. 1112e | 300 pcs per IDR | 0.75 |
| Ty. 1113a | Handbags | Ladies' bag | 50 pcs per TDR | Ty. 1113a | 55 pcs per IDR | 1.10 |
| | Backpacks | | | Ty. 1113b | 54 pcs per IDR | 1.08 |
| | School | | | Ty. 1113c | 40 pcs per IDR | 0.80 |
| | Business | | | Ty. 1113d | 45 pcs per IDR | 0.90 |
| | | | | Ty. 1113e | 30 pcs per IDR | 0.60 |

FIG. 5

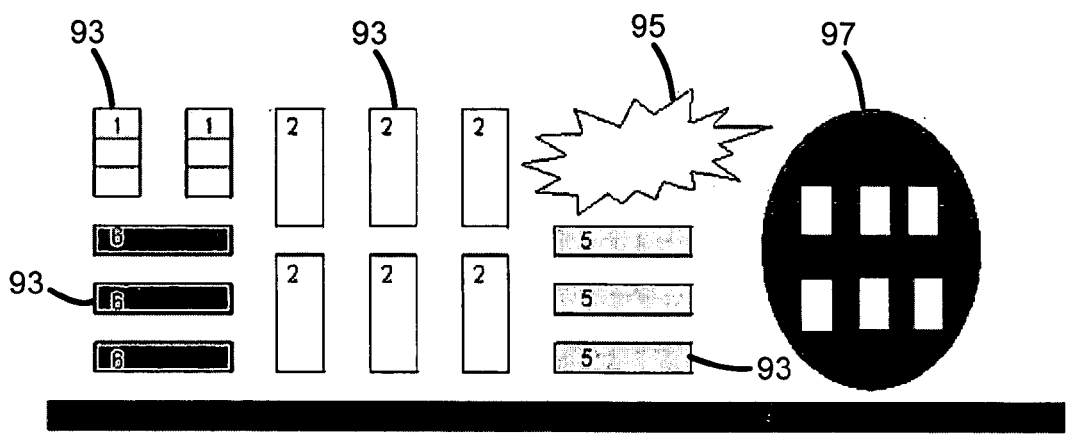

FIG. 6

Category 1

Capacity

| Price Level | 1 | 2 | 3 | 4 | 5 | 6 | 7 | 8 | 9 |
|---|---|---|---|---|---|---|---|---|---|
| 1 | | | | | | | | | |
| 2 | | | | | | | | | |
| 3 | | | | | Assort-ment35 ←172 | | | | |
| 4 | | | | | | | | | |

FIG. 11

SYSTEM AND METHOD FOR PERFORMING ASSORTMENT PLANNING

CROSS-REFERENCE TO RELATED PATENT APPLICATIONS

This application claims the benefit of U.S. Provisional Application No. 60/551,221, filed Mar. 8, 2004 and entitled "Inventory Management," and U.S. Provisional Application No. 60/563,284, filed Apr. 16, 2004 and entitled "Inventory Management," both of which are hereby incorporated by reference. This application is a continuation of U.S. application Ser. No. 10/910,783, filed Aug. 2, 2004 and entitled "System And Method For Assortment Planning," which is a continuation of U.S. application Ser. Nos. 10/898,892 and 10/899,385, both filed Jul. 26, 2004 and entitled "System And Method For Assortment Planning"; both of which are a continuation-in-part of U.S. application Ser. No. 10/886,260, filed Jul. 6, 2004 and entitled "System And Method For Performing Assortment Definition," the entire contents of which are hereby incorporated by reference.

FIELD OF THE INVENTION

The present invention relates generally to the field of merchandise and assortment planning, and more specifically to the use of systems and methods for facilitating assortment planning decisions.

BACKGROUND OF THE INVENTION

In general, business models can involve buying merchandise and services for one price and selling it for another. In the process, sellers can incur spectacular costs marketing to prospective and existing customers, leasing stores, paying employees, buying and maintaining information technology, transporting, and, most importantly, buying and managing the merchandise itself.

Planning, at one level, is a strategic activity. Executives set business objectives and merchandise planners derive strategies to meet them: back to basics to reduce the style count, extended assortments with additional colors and styles, or new lines of business such as health & beauty. On another level, planning is tactical and operational. The plan influences how many styles and colors a merchant will carry. It influences how distributions are planned for stores. It influences when markdowns are expected to be taken for each style and color. It also influences which stores should carry each style.

One of the most important processes of such planning is assortment planning. Assortment planning provides answers to basic questions such as: Which product or service? How much of it? What colors? What sizes? What locations? Who is the target customer? When should it be offered? How long should it be offered? and so forth. Thus, the old adage, the right product, at the right place, at the right time, still holds true in today's marketplace, but with one important change. Sellers—whether traditional brick-and-mortar, e-commerce or a combination of the two—must have a compelling selection of merchandise for the right customer as well. Thus, an effective assortment planning process that provides the right products and services at the right locations at the right time is essential for successful modern business operation.

An effective assortment planning process is ever more necessary in retail environments and particularly in fashion retail environments. Retail environments and fashion retail environments often require that the business adjust to relatively fickle needs of the consumer.

Although assortment planning directly affects product selection, price, timing and micro-merchandising, it has often been de-emphasized due to hectic retail schedules. Extinguishing delivery fires and meeting marketing and financial planning obligations use valuable time, forcing companies to take the easy approach to merchandising: repeating assortment breadth and depth from previous seasons, creating store assortments based on store volume, and ranking items by sales volume alone.

Yet, to attract the right customer in today's increasingly competitive environment, assortment planning must focus on creating appropriate product breadth and depth of products based on the customer's desires and shopping patterns, taking into account lifestyles, climates, trends and more. Furthermore, assortment planning must present a compelling mix of products to illustrate the company's strategic vision.

In view of the foregoing, it would be beneficial to provide a method and system that provides efficient implementation of assortment planning decisions for merchandise. Moreover, it would be beneficial to provide a method and system that allows for more flexible assignments of products and stores to assortments.

SUMMARY OF THE INVENTION

The present invention relates to systems and methods for performing assortment definition/planning (i.e., matching the right articles with the right stores at the right times).

According to a first embodiment of the present invention, a method is provided for planning an assortment. The method comprises assigning a first article to the assortment via a first intermediate link; and assigning a first validity period to the first intermediate link to determine a first time period during which the first article is in the assortment.

According to another embodiment, a system is provided for planning an assortment. The system comprises means for assigning a first article to the assortment via a first intermediate link, and means for assigning a first validity period to the first intermediate link to determine a first time period during which the first article is in the assortment.

According to yet another embodiment, a program product for planning an assortment comprises machine-readable program code. The program code, when executed, causes one or more machines to perform method steps. The method steps include assigning a first article to the assortment via a first intermediate link, and assigning a first validity period to the first intermediate link to determine a first time period during which the first article is in the assortment.

Other features and advantages of the present invention will become apparent to those skilled in the art from the following detailed description and accompanying drawings. It should be understood, however, that the detailed description and specific examples, while indicating preferred embodiments of the present invention, are given by way of illustration and not limitation. Many modifications and changes within the scope of the present invention may be made without departing from the spirit thereof, and the invention includes all such modifications.

BRIEF DESCRIPTION OF THE DRAWINGS

FIG. 5 illustrates an exemplary view of a particular business type definition.

FIG. 6 illustrates an exemplary view of a layout for articles in a presentation area.

FIG. 11 is a diagram illustrating a matrix spanned by two strategic dimensions which may be used for performing the assortment definition process illustrated in FIGS. 9 and 10.

DETAILED DESCRIPTION OF THE EXEMPLARY EMBODIMENTS

Figure 1:
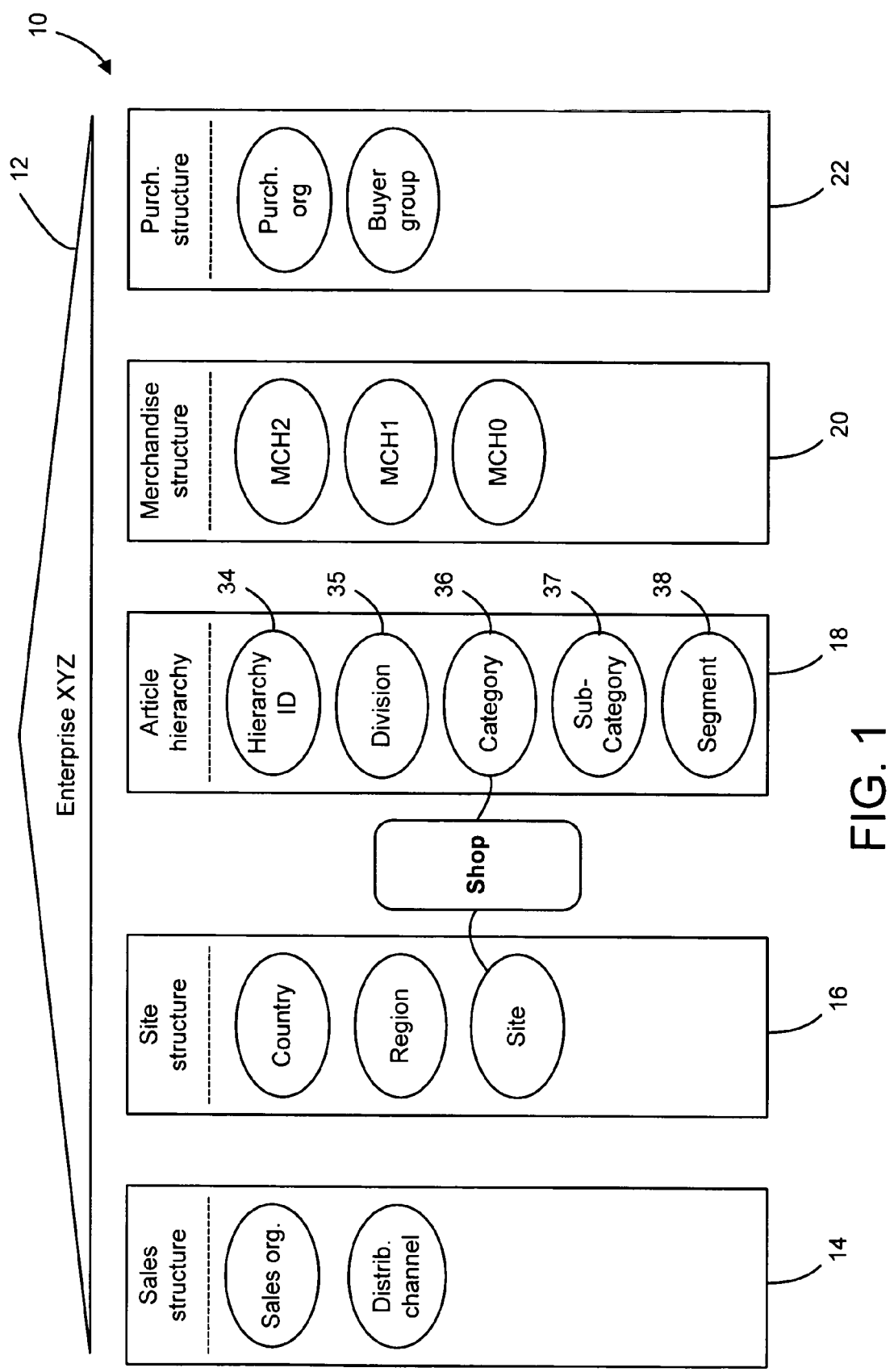
FIG. 1 is a diagrammatic representation of an exemplary enterprise structure for a large retail company.

FIG. 1 illustrates a general overview of an enterprise structure 10 for a company or enterprise 12 (e.g., "Enterprise XYZ") having five segments (or data structures): a sales structure 14, a site or store structure 16, an article hierarchy (or theme structure) 18, a merchandise hierarchy 20, and a purchasing structure 22. Enterprise 12 may be any type of company that regularly needs to perform merchandise and assortment definition and planning, such as a large retail company, a service provider, a non-retail supplier of goods, and the like.

Figure 2:
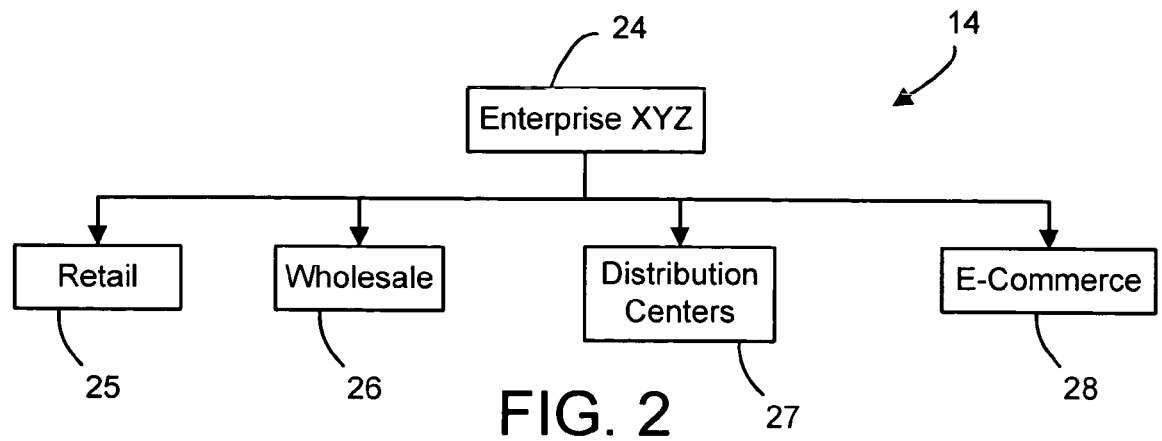
FIG. 2 is a diagrammatic representation of an exemplary sales structure for a large retail company.

Sales structure 14 represents the different sales channels used by enterprise 12. For example, FIG. 2 illustrates one possible arrangement for sales structure 14 as configured for a large retail chain. Sales structure 14 in this example includes an enterprise level node 24 and four sales channel level nodes. The four sales channel nodes include a retail sales channel 25, a wholesale sales channel 26, a distribution center sales channel 27, and an e-commerce sales channel 28. Sales structure 14 may be customizable by a user to include additional or fewer levels, as well as different names, to better represent the sales channels associated with a particular enterprise.

Figure 3:
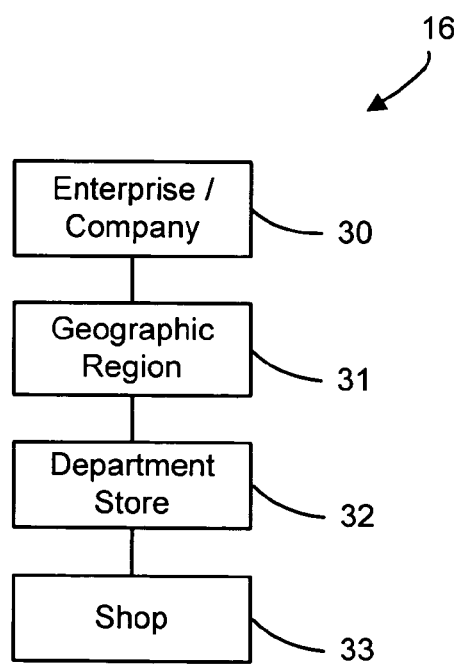
FIG. 3 is a diagrammatic representation of an exemplary site structure for a large department store chain.

Referring again to FIG. 1, site structure 16 represents the local, operative units within which the sale and logistics handling of merchandise (i.e., products or articles) or services takes place. Typical examples of such sites include stand-alone stores as well as department stores, which unify collections of shops or departments representing various consumer themes (e.g., merchandise categories presented to consumers in unified manner, individual shops in department stores, etc.). FIG. 3 illustrates one possible arrangement for site structure 16 as configured for a large department store chain. In this example, site structure 16 includes an enterprise level 30, a geographic region level 31 (e.g., NE, NW, SE, SW), a department store level 32, and a shop level 33. Site structure 16 may be customizable by a user to include additional or fewer levels, as well as different names, to better represent the sites associated with a particular enterprise.

In contrast to conventional stores, department stores typically do not have inventory-managing character for consumer merchandise, because inventory management on an article or value basis usually takes place at the shop level. Nonetheless, the department store can represent an overreaching inventory management level for consumable materials, advertising materials, and additionals. Although the department store conventionally groups shops at a physical address, this is not a requirement. For example, different shops can exist at separate physical locations and still be assigned logically to the same department store. Unless otherwise specified below, the term "store" may refer to a conventional store, a department store, or any of the individual shops or departments unified by a department store.

Referring again to FIG. 1, article hierarchy 18 represents a hierarchy of articles down to the segment level. As will become clear below, article hierarchy 18 represents one of many possible ways to hierarchically organize and view articles and make assortment decisions. In FIG. 1, article hierarchy 18 is illustrated with a hierarchy ID level (e.g., a number) 34, a division level 35, a category level 36, a subcategory level 37, and a segment level 38. Article hierarchy 18 may be customized by a user to include additional levels (e.g., a subsegment level below segment level 38) or fewer levels, as well as different names, to better represent the merchandise (e.g., products or articles) layout associated with a particular enterprise. According to an exemplary embodiment, theme structures may be defined with up to 10 levels.

Although the names and number of levels in article hierarchy 18 can be customized, one level in article hierarchy 18 must be defined as the "category" level. The category level may be selected to represent the independent presentation spaces in a store that are devoted to merchandise categories presented to consumers in a unified manner. In the department store context, for example, the category level in article hierarchy 18 may be selected to represent differentiated groupings of shops in the department stores such as confectionaries, menswear departments, and ladies wear departments. Alternatively, a lower level in article hierarchy 18 may be selected to represent the different independent presentation spaces for subgroups of merchandise (e.g., long-arm blouses, short-arm blouses, trousers) within each shop in a department store. Other criteria for selecting the category level may also be used.

In an exemplary embodiment, the level in article hierarchy 18 selected to be the category level has several additional properties that are unique to that level. One unique property of the category level is that stores can be assigned only to that level. In FIG. 1, for example, the assignment of shops in site structure 16 to nodes in category level 36 of article hierarchy 18 shows that category level 36 has been defined as the category level. These assignments make sense primarily in the context of department stores, wherein the stores that are assigned to a category are the shops in different department stores which (primarily) present goods from this category. For example, in most department stores there is a section for "men's fashion." Hence, a category may be defined in the system for "men's fashion," and this section in the department store may be treated as a shop in the system.

Another unique property of the category level in article hierarchy 18 is that the assignment of articles (as described in detail below) to hierarchy 18 must be unique below the category level. That is, each article can be assigned only once to a node at or below a particular category node. By contrast, the same article can be assigned again to a different node at or above the category level (e.g., the division level).

Figure 4:
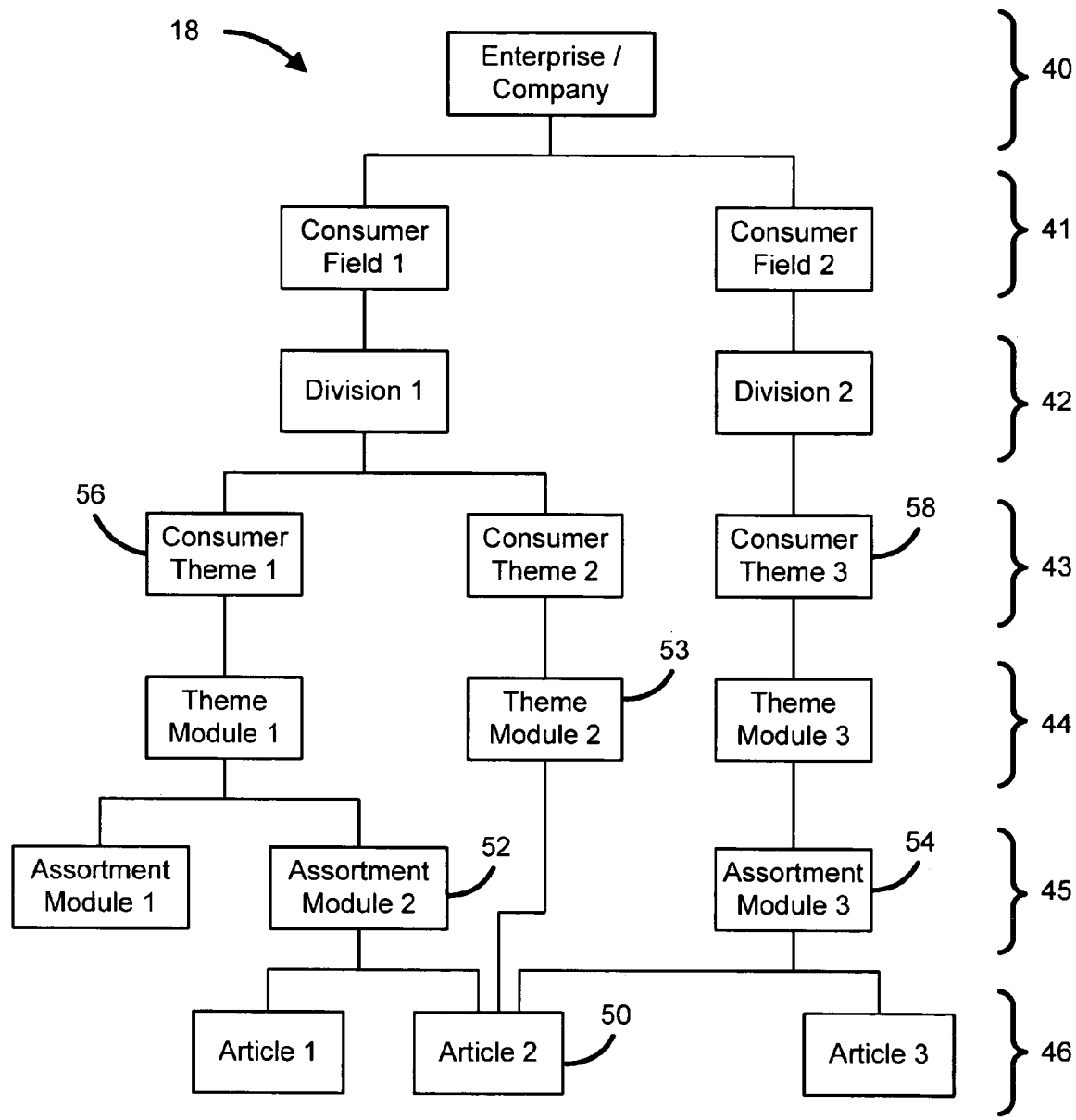
FIG. 4 is a diagrammatic representation of an exemplary article hierarchy for a large retail company.

Reference is now made to FIG. 4 to further illustrate how article hierarchy 18 may be used by an enterprise to better represent merchandise based on, for example, the arrangement of articles and products for displayed in the stores and shops. In this example, article hierarchy 18 has been defined to include seven distinct levels, comprising: an enterprise level 40, a consumer field (CF) level 41, a division level 42, a consumer theme (CT) level 43, a theme module (TM) level 44, an assortment module (AM) level 45, and an article level 46. CF level 41 may be selected to represent different high level groupings of merchandise (e.g., fashion, sport). CT level 43 may be selected to represent merchandise categories presented to consumers in unified manner, such as the individual shops in a department store. TM level 44 may be selected to represent the different independent presentation spaces for subgroups of merchandise (e.g., long-arm blouses, short-arm blouses, trousers) within each shop in a department store. AM level 45 may be selected to group articles according to various criteria such as the time periods during which such articles will be displayed, the stores to which they will be assigned, etc.

According to an exemplary embodiment, the relationships between the various nodes in article hierarchy 18 may be as follows. The relationship between the nodes of each level above AM level 45 and the node(s) in the next lower level may be 1:n. That is, each node in TM level 44 may be assigned or linked to one or more child nodes in AM level 45, while each node in AM level 45 is linked to exactly one parent node in TM level 44. In contrast to the nodes above AM level 45, the relationships between the nodes in AM level 45 and the nodes in article level 46 may be n:m. That is, a single node in AM level 45 may be linked to one or more child nodes in article level 46, while each node in article level 46 may be linked to one or more parent nodes in AM level 45 so long as each parent node in AM level 45 is in a different category. Thus, in the embodiment illustrated in FIG. 4, article node 50 may be linked to both AM node 52 and AM node 54 in AM level 45 because nodes 52 and 54 are assigned to different categories. In particular, AM node 52 is assigned to the category represented by CT node 56 and AM node 54 is assigned to the category represented by CT node 58. In some embodiments, individual articles in article level 46 may be assigned directly to nodes above AM level 45. For example, article node 50 may be linked directly to TM node 53. This assignment is permissible because TM node 53 is assigned to a different category than either CT node 56 or 58. In an exemplary embodiment, the user can set a flag to indicate whether the assignment of individual article nodes to more than one parent node in AM level 45 and/or to other higher level nodes is allowable or prohibited.

After a theme structure has been defined for a company such as described above, one or more business types may be defined for each consumer theme (e.g., each shop in a department store) to further facilitate assortment definition and planning as described below. A business type definition may be a grouping of all stores of a consumer theme, grouped according to criteria level and capacity, using a standardized procedure. Hence, the business type may be defined for every reasonable combination of level type and capacity for a consumer theme. As such, business type definitions can be used to provide strategic grid spacing of stores according to presentation capacity and level, in consultation with division and sales, taking account of location-specific circumstances. The aim of the level type is to describe a CT/store (e.g., a shop in a department store) with regard to the level of the assortment (defined, for example, by price level, brands features, and so on). Thus, the level type of a CT/store is determined based on question such as, in which price categories, with which brands, and which special features is an assortment carried. The capacity type aims to describe a CT/store with regard to its capacity size expressed in, for example, a number of template display racks. Thus, the capacity of a CT/store is determined based on questions such as, how many articles can be carried, with which width and depth.

According to an exemplary embodiment, one or more business types (BT) may be defined for each consumer theme. An exemplary view 91 of a business type definition (with a rule set for capacity index) is shown in FIG. 5. The capacity index indicates a capacity relationship between template display racks (TDR) and individual display racks (IDR). Although not illustrated in view 91, each BT definition may include a specific time reference (e.g., valid-from/valid-to dates). In addition, the capacity type and level type of each BT may be defined by numbers N and M. In this case, the number of the capacity type for each business type represents a particular capacity range (e.g., N=1 may correspond to a capacity index between 0 and 1.0, N=2 may correspond to a capacity index between 1.0 (inclusive) through 2.0, etc.). Similarly, the number of the criteria level for each business type represents the "level" of articles offered for sale (e.g., M=0 may correspond to a flagship store, M=1 may correspond to a high end store, M=2 may correspond to a medium end store, and M=3 may correspond to a low end store). Instead of determining business types based on criteria level and capacity, business types may be determined based on or in combination with other relevant criteria such as historical consumption data by price level.

After the business types have been defined, one or more layout modules may be assigned to each business type definition to facilitate assortment planning such as described below. The layout module provides a pictorial view of the areas in the stores of the selected business type that are available to sell a particular consumer theme. For example, separate regions of the stores may be shown as separate "blocks" on a computer screen, whereby their respective locations and sizes correspond to their actual locations and sizes in the stores. For example, FIG. 6 shows an exemplary assignment plan including a plurality of layout modules 93 (indicated as rectangles) of various capacities. FIG. 6 also illustrates a space 95 for promotions/close-outs and another space 97 for fashion merchandise. This information is obtained beforehand and is stored in a memory for retrieval when particular stores or business types are selected.

Figure 7:
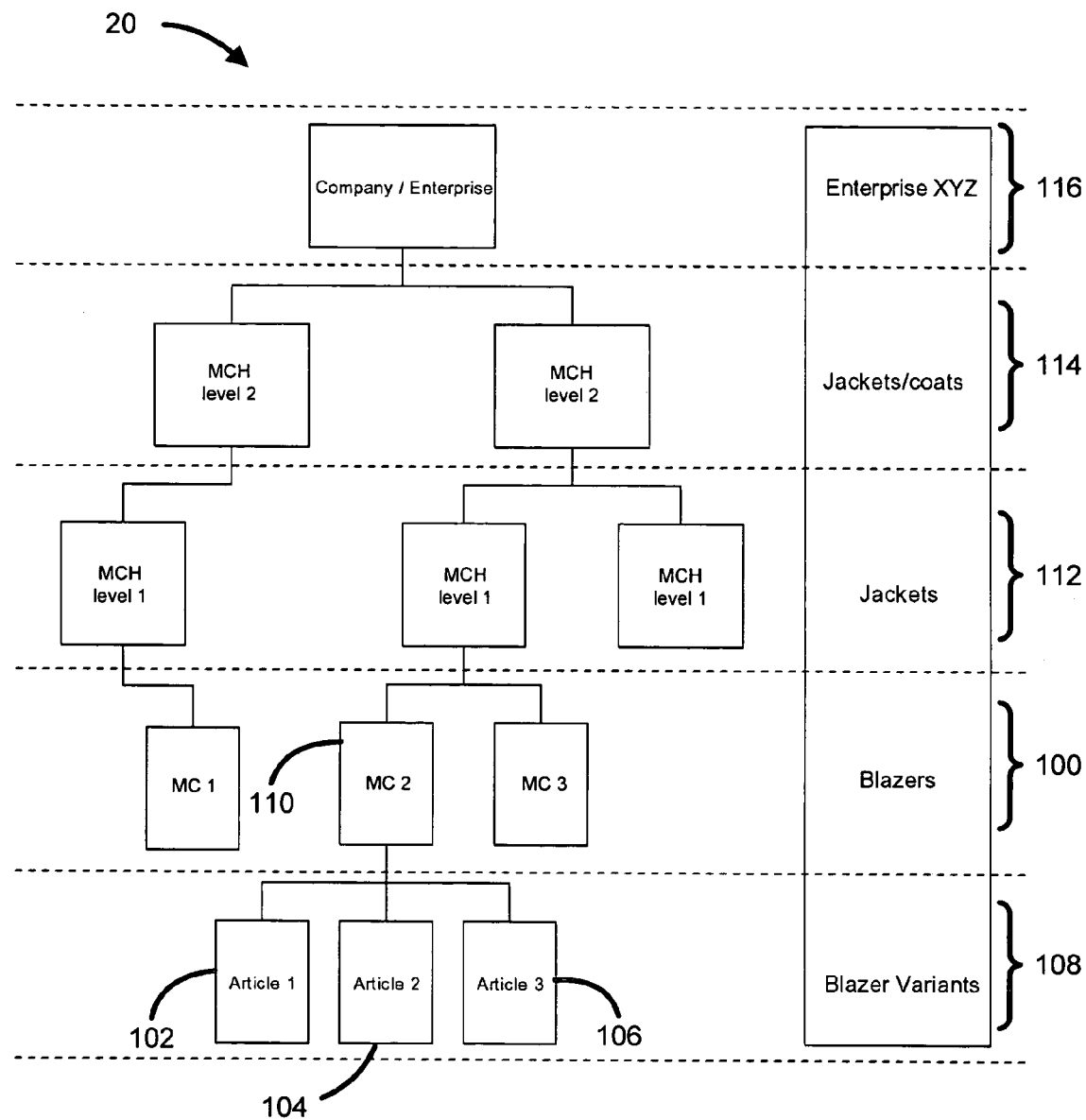
FIG. 7 is a diagrammatic representation of an exemplary merchandise hierarchy.

Referring again to the five segments of enterprise structure 10 described with reference to FIG. 1, merchandise hierarchy 20 provides an alternative way of hierarchically organizing and viewing articles and making assortment decisions. An exemplary embodiment of merchandise hierarchy 20 is shown in FIG. 7. Merchandise hierarchy 20 represents a long-term article grouping in a classification structure that is independent of the store structure and merchandise presentation layout. Instead, merchandise is grouped in hierarchy 20 based on common inherent characteristics of the merchandise (e.g., all beverages may be grouped together regardless of their type and how or where they are displayed in the stores).

In FIG. 7, a merchandise (MC) level 100 represents the lowest level in hierarchy 20. This means that different articles that are assigned to the same MC node usually have at least the same characteristic(s) represented by the MC node. For example, articles 102, 104 and 106 (comprising three blazers having different styles, sizes and/or colors) in an article level 108 are assigned to a single MC node 110 and thus have at least the same characteristic(s) (e.g., they are all blazers) represented by MC node 110. According to an exemplary embodiment, each article is assigned to exactly one MC node in hierarchy 20, and multiple MC nodes can be grouped together to form merchandise hierarchy (MCH) levels. For example, merchandise hierarchy 20 is illustrated with a first MCH level 112 (comprising a "jackets" category) immediately above MC level 100, and a higher MCH level 114 (comprising a "jackets/coats" category) above MCH level 112. Similar to article hierarchy 18, the topmost layer in merchandise hierarchy 20 is an enterprise level 116. The nodes in the lowermost level in hierarchy 20 and in similar merchandise group hierarchies may be referred to as merchandise categories. Thus, categories may represent differentiated, independently controllable group of articles and/or services that consumers recognize as different and/or exchangeable to satisfy a need.

A merchandise hierarchy may be formed for various reasons. For example, it may be formed to: (i) plan an assortment (as described in detail below), (ii) enable structured analyses in the information system and the planning of target and actual values at the MC level, and (iii) save common data (such as conditions) at superior levels to reduce storage space. According to an exemplary embodiment, the following information may be defined for each MC node: price, color, and size groups; validity periods; n characteristics, and status values. In this embodiment, colors may be saved hierarchically as main colors or single colors. The main colors can have various characteristic values, which represent the single colors. In this case, the single colors are variant-creating characteristics. Accordingly, a merchandise group hierarchy having this structure would allow for analysis of main colors, single colors, and attribute values.

The characteristics of articles in a merchandise hierarchy may be used for classification. Characteristics represent defined properties of an object, such as the color of a blouse. Characteristics help to differentiate objects from one another and find specific articles in the information system (e.g., list all articles with characteristic value "Red" of the "Color" characteristic). Characteristics can be either variant-creating (i.e., used in the definitions of the article variants) or purely informative. According to an exemplary embodiment, two or three-dimensional variant-creating characteristics can be defined for each MC node.

According to anther embodiment, below the MC level, and thus below the entire merchandise hierarchy, characteristic profiles may be defined to segment or specialize the merchandise hierarchy. This may be done to simplify the creation of new generic articles, variants, and single articles.

In this embodiment, a characteristic profile may be used to define the set of values for a characteristic that are permitted in that particular profile. For example, a characteristic profile called "Ladies' sizes, Germany" could define the sizes 34 to 48. Multiple characteristic profiles can be created for multiple merchandise groups. A characteristic profile can be assigned several times within the merchandise group hierarchy. Thus, every article that is assigned to a merchandise group can optionally be assigned to a characteristic profile. According to an exemplary embodiment, the relationship between characteristic profiles and merchandise groups is n:m. That is, a single characteristic profile can be linked to multiple merchandise groups, and vice versa.

As persons skilled in the art will appreciate, the use of characteristic profiles provides several advantages. For example, characteristic profiles can be used to (i) group sets of colors and sizes, (ii) assign them to the relevant merchandise groups, and (iii) select the suitable profile when creating articles.

Returning again to FIG. 1, purchasing structure 22 models the areas of responsibility and authority in purchasing. It consists of several buyer groups below each purchasing organization. According to an exemplary embodiment, each article is assigned to a unique buyer group. The unique assignment of buyer groups to merchandise groups is preferred, but not required.

Turning now to FIGS. 8-15, a number of embodiments will be presented for performing assortment definition and planning using the structures, hierarchies, business type definitions, layout modules and other features described above to both speed up and simplify the assortment definition and planning processes. Although the description of assortment definition and planning is presented below in the context of a retail planning cycle, the present application is not limited to retail goods or planning cycles.

In accordance with an exemplary embodiment, assortment definition and planning can be performed for various types of merchandise such as fashion merchandise and regular (e.g., stackable, non-fashion, basic, etc.) merchandise. As persons skilled in the art will appreciate, assortment definition and planning for fashion may differ from assortment definition and planning for regular merchandise for various reasons. For example, assortment definition and planning for fashion generally involves: (1) a higher proportion of new articles; (2) shorter life cycles than the assortment planning horizon, and different, reduced possibilities for short-term replenishment; and (3) capacity use is subject to fluctuations within an assortment planning period. Thus, assortment definition and planning for different types of merchandise may be handled differently. In an exemplary embodiment, for example, assortment planning for regular merchandise may be performed at the theme module level and from month-to-month, while assortment planning for fashion may be performed at the consumer theme level and from season-to-season.

In the various embodiments discussed below, assortment definition and planning for an enterprise may be performed using both local assortments and global assortments. When a store or distribution center is first created, an assortment with the same name is also created. This may be referred to as a local assortment. When articles are listed for these local assortments, they can be managed in the respective store in a single step.

Assortments can also be defined which include several stores. These may be referred to as global assortments. Merchandise quantities can be planned for these global assortments, and thus for a group of stores, in the assortment planning processes described below. Articles that are listed for a global assortment can thus be managed for all assigned stores at one time.

Figure 8:
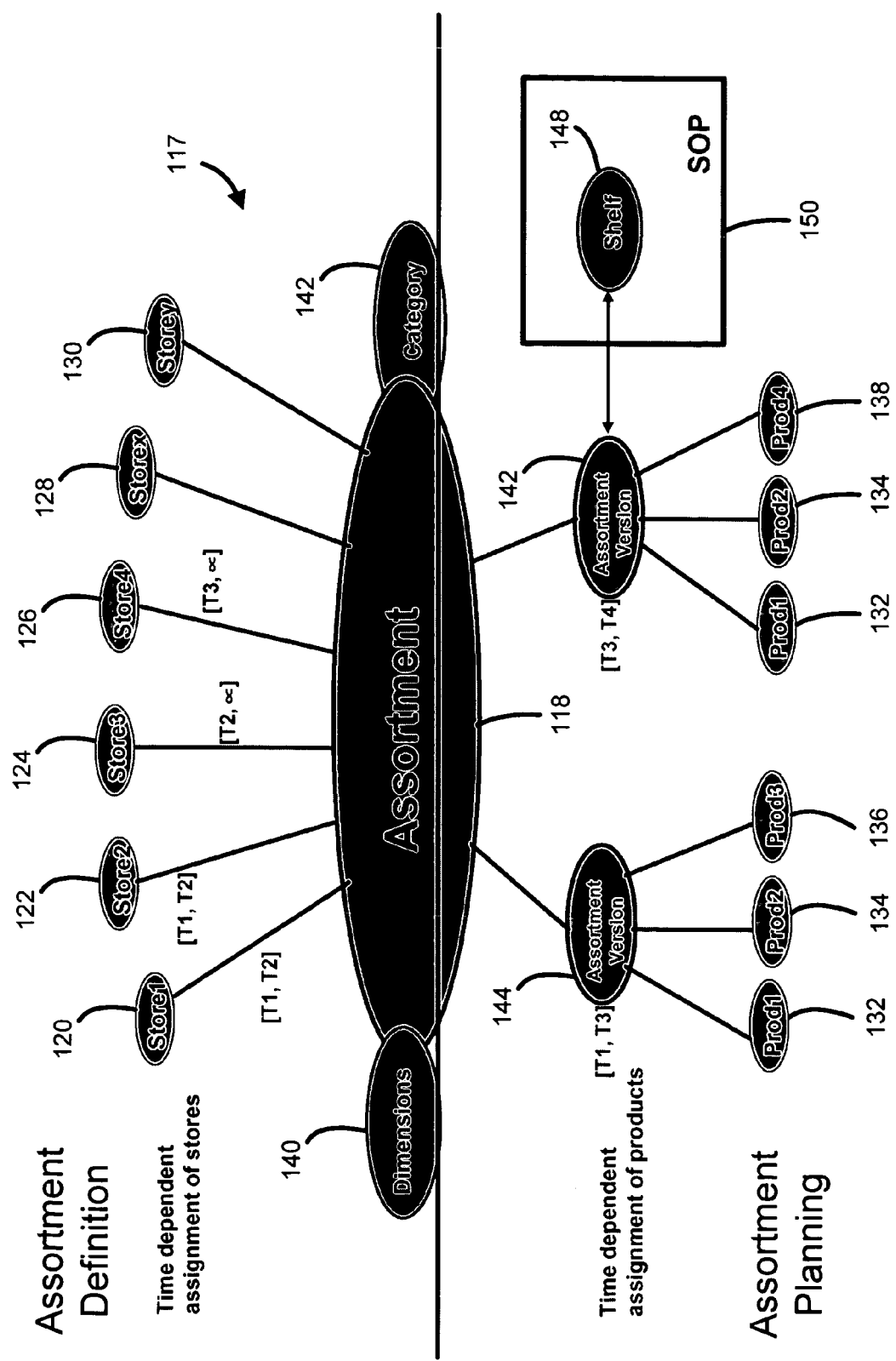
FIG. 8 is a diagrammatic representation of an exemplary global assortment that links together a plurality of stores and a plurality of articles at specific times.

With the foregoing in mind, FIG. 8 illustrates a diagram 117 including a global assortment 118 that links together a plurality of stores 120, 122, 124, 126, 128 and 130 with a plurality of articles 132, 134, 136 and 138. According to an exemplary embodiment, articles are always linked to an assortment (either local or global), rather than directly to retail sites.

Global assortments such as assortment 118 may be classified according to assortment type. Assortment type refers to an assortment attribute that makes it possible to control the strategic direction of the assortment and its handling during assortment design/planning and procurement. In one embodiment, the possible values for the assortment type may be configured by the user. For example, assortments can express the following types: standard assortment—fashion; supplementary assortment—fashion; and regular (e.g., non-fashion) assortment.

In the illustrated embodiment, assortment 118 may also be characterized by one or more assortment dimensions 140. In general, assortment dimensions are attributes of an assortment that can be used during an assortment definition process to group retail sites together to design standardized assortments. That is, the assortment dimensions are used to group together retail sites with similar characteristics to form an assortment that applies to all stores in the group. Retail sites can be grouped differently for different assortment types, i.e., different dimensions can be used as grouping criteria. According to an exemplary embodiment, an assortment can be defined using up to three assortment dimensions. The respective value range or level of the assortment dimensions may be defined and configured by a user. The value range or level of an assortment dimension can be defined differently for each assortment type. By way of example, possible assortment dimensions may include the following retail site characteristics: capacity, price level/grade (high fashion, essential, basic) or sales for a certain group of merchandise, geographical region or location, climactic zone (warm weather, cold weather), demographics (urban, suburban), retail concept, and so on.

With the foregoing in mind, an exemplary assortment may comprise a plurality of retail sites (e.g., store consumer themes or shops in a department store) grouped by category (e.g., consumer theme) with regard to price level/grade and capacity type. Grouping stores by price level and capacity is equivalent to grouping stores by business type as discussed above. In this example, one assortment dimension is the capacity, which may be represented by the following values: "0" to "9" for assortments with type "standard assortment—fashion" and "supplementary assortment—fashion;" and "1" to "6" for assortments with type "regular assortment." The other assortment dimension in this example is the price level/grade, which may be used only for assortment type "standard assortment—fashion" with the four values "1"—high-priced, "2"—mid-priced, "3"—low-priced, and "0" for exceptional cases (e.g., flagship stores and showpieces).

Referring again to the embodiment illustrated in FIG. 8, assortment 118 may also be characterized by a category 142 (e.g., category level 36 in FIG. 1 or consumer theme level 43 in FIG. 4). Alternatively, assortment 118 may be characterized by another level in article hierarchy 18 such as subcategory level 37 or segment level 38 in FIG. 1. In assortments characterized by store category, two of the three assortment dimensions can be classified as, for example, level type and capacity type. Accordingly, a matrix-like definition of the store types can be mapped. By selecting a certain level type, the corresponding capacity types (e.g., extra small, small, medium, large, extra large) can be planned first. The planned quantities can then be copied to assortments with the same capacity type, but an alternate level type.

Referring once again to FIG. 8, articles 132-138 in the illustrated embodiment are not directly assigned to assortment 118. Instead, articles 132-138 are linked to assortment 118 by assortment versions 144 and 146 during assortment planning. In the illustrated embodiment, each assortment version 144, 146 is active or valid for a specified period of time (e.g., valid-from/valid-to dates). For example, articles 132, 134 and 136 are linked to assortment 118 by assortment version 144, which is active between dates/times T1 and T3. Similarly, articles 132, 134 and 138 are linked to assortment 118 by assortment version 146, which is active between dates/times T3 and T4. As persons skilled in the art will recognize, the foregoing time dependencies of the assignments of articles 132-138 to assortment 118 provides for automatic regular (e.g., every month or six weeks) releases of merchandise in the stores to maintain assortment freshness.

According to an exemplary embodiment, each assortment version 144, 146 may represent one or more shelves 148 in each store assigned to assortment 118. Alternatively, each assortment version 144, 146 may represent one or more display racks (which in turn may comprise a plurality of shelves), or one or more layout modules (which in turn may comprise a plurality of display racks). If desired, a space optimization program (SOP) 150 may be used to determine the optimum layout of articles for each assortment version 144, 146.

In the embodiment illustrated in FIG. 8, the assignment of stores 120-130 to assortment 118 during assortment definition also includes time dependencies. For example, stores 120 and 122 may be linked to assortment 118 between dates/times T1 and T2, while stores 124 and 126 may be assigned to assortment 118 starting at dates/times T2 and T3, respectively. In the illustrated embodiment, the assignments of the latter two stores 128 and 130 to assortment 118 is not time dependent, i.e., stores 128 and 130 will remain in assortment 118 until such time as assortment 118 is canceled or changed. The time dependencies of the store assignments may be stored in a data structure that also stores the store assignments.

As indicated in FIG. 8, the assignment of stores to an assortment (i.e., the upper half of diagram 117) may be referred to herein as assortment definition. By contrast, the assignment of articles to an assortment (i.e., the lower half of diagram 152) may be referred to herein as assortment planning. Of course, persons skilled in the art will recognize that different retail merchants may utilize different terms for referring to these two concepts and hence the specific terms of assortment definition and assortment planning should be understood as provided merely for purposes of facilitating explanation of the various exemplary embodiments.

Figure 9:
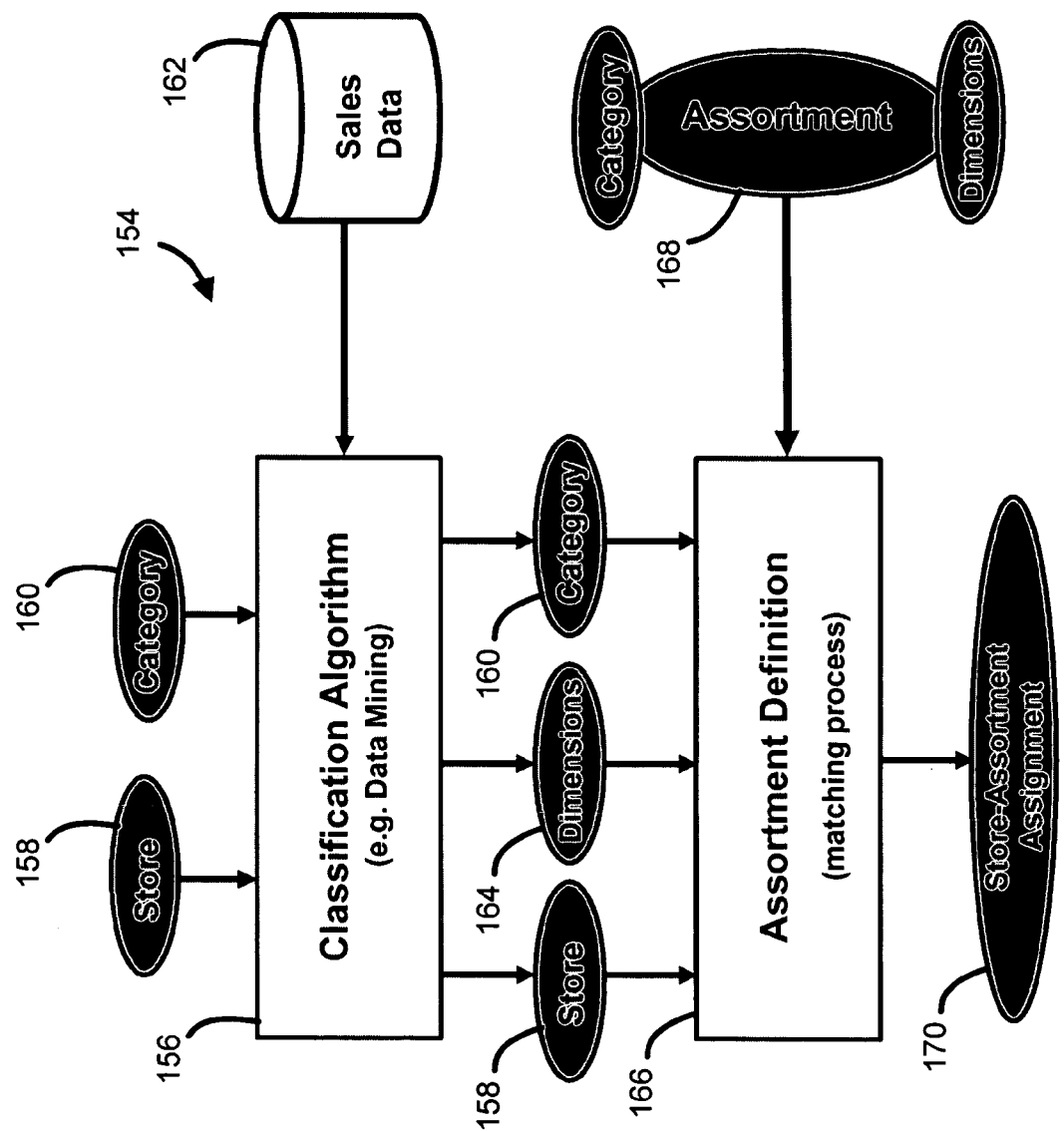
FIG. 9 is a data-flow diagram showing an exemplary assortment definition process.

Referring now to FIG. 9, a data-flow diagram shows an exemplary process 154 for performing assortment definition (i.e., defining assortment objects and the store assignments). According to an exemplary embodiment, process 154 includes a classification algorithm engine 156 that receives inputs such as store information 158, category information 160, and sales information 162. The source(s) of input information provided to engine 156 may comprise a keyboard, mouse, or similar input device. Alternatively, the source(s) of input information provided to engine 156 may comprise one or more storage systems, such as a database. As another alternative, the source(s) of input information to engine 156 may comprise one or more computer systems that are locally or remotely connected to engine 156. In the illustrated embodiment, for example, sales information 162 is shown as being provided from a database which contains historical transaction data (e.g., sales data from a comparable period in a prior year, which may be adjusted for recent sales trends). Sales data may also include forecasted or projected sales transaction data for a future time period (e.g., the upcoming season). Forecasted sales data may also be based on a markdown profile for an article or group of articles. The assignment of a markdown profile to an article or group of articles is described in further detail in a co-pending application entitled "Automated Control Of Pricing Using Markdown Profiles" filed on Jun. 24, 2004, the entire contents of which are incorporated herein by reference.

Regardless of the source(s) of input information 158-162, classification engine 156 performs a classification algorithm that mines the input information to identify one or more dimensions 164 that may be suitable for characterizing the stores that are eligible for inclusion in the assortment. After completing this task, classification engine 156 provides the identified dimension information 164 to an assortment definition engine 166 along with the original input information (e.g., store information 158 and category information 160) or a subset thereof.

Assortment definition engine 166 uses the dimension information (possibly after approval by a user) and other input information (e.g., information 158-160) along with previous and existing store assignments and assortment information 168 to perform a matching process that clusters or groups stores into proposals for store-assortment assignments 170. The matching criterion is based on the similarity of dimension values of stores (e.g., as found by the classification algorithm) to the dimension values, which may be assigned manually to the assortment object. The proposed store-assortment assignments 170 may be presented to management for approval and release and/or used as inputs to one or more downstream processes without review. The foregoing process may be utilized to automatically generate proposals of suitable store groupings (e.g., by business type) for assortments as well as when to implement them.

Figure 10:
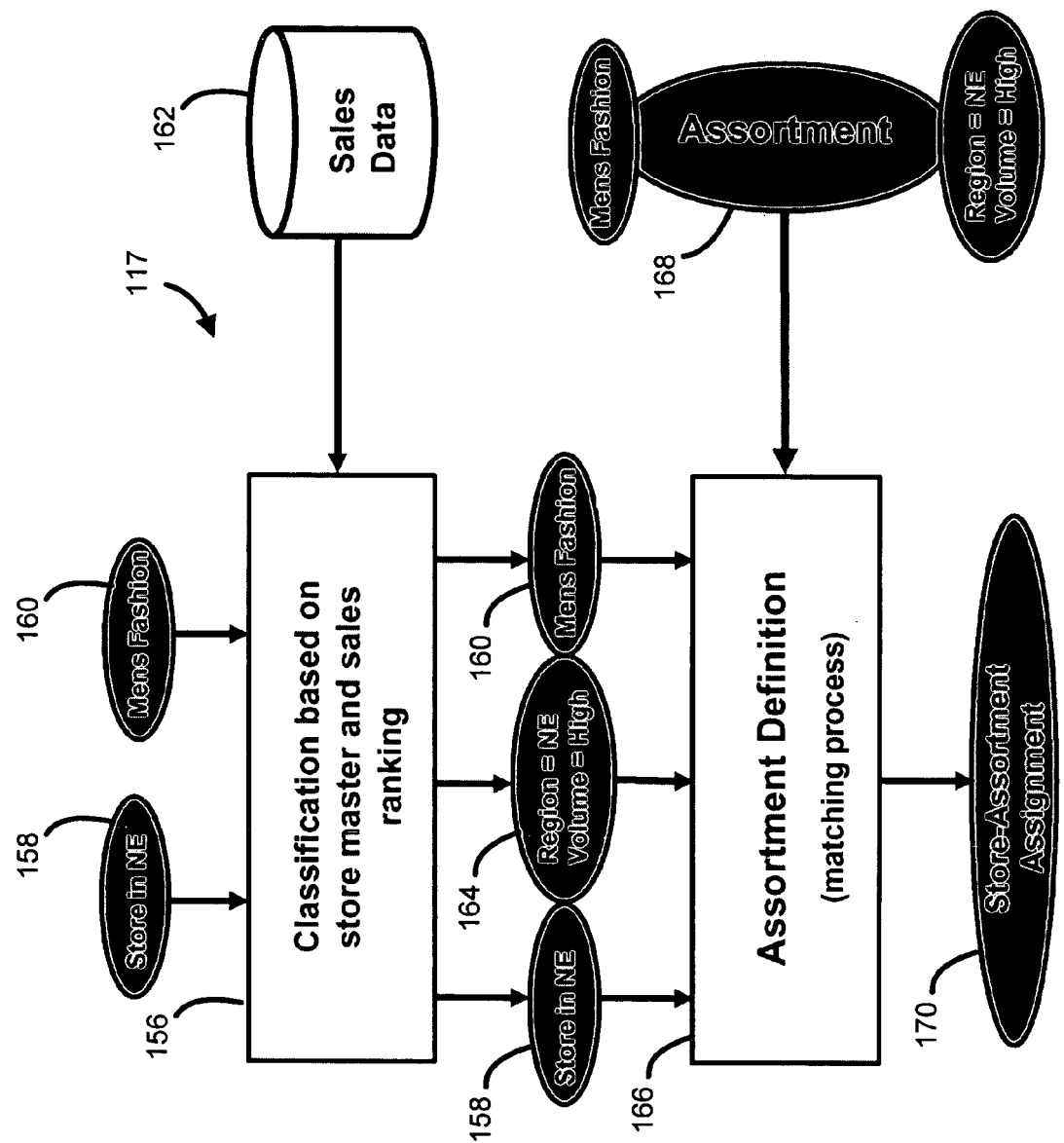
FIG. 10 is a data-flow diagram illustrating the process described with reference to FIG. 9 in the context of a specific store and category.

With reference now to FIG. 10, an example of how assortment definition process 154 may be used to perform store-assortment assignments in a specific context will be provided. In the illustrated embodiment, store input information 158 includes the locations of the stores (e.g., stores in the northeast) and associated category input information 160 (e.g., the consumer theme of "Men's Fashion"). Based on store master and sales ranking information, classification engine 156 identifies the region and sales volume of each store. The particular dimensions (e.g., region and sales volume) used to analyze each store and generate associated dimension information 164 (e.g., that the store is in the region NE and is a high volume store with respect to the category "men's fashion") may be prescribed by a user.

This dimension information 164 is provided to assortment definition engine 166 along with store input information 158 and category input information 160. At the same time, assortment definition engine 166 also receives information regarding any previous and existing store assignments and assortments 168 that are based on similar dimension and category information. Using this data, assortment definition process 154 is able to provide a closed-loop system that allows for improved refinement over subsequent iterations. As explained above, assortment definition engine 166 performs a matching process and outputs a recommended store-assortment assignment 170. The end result of this process is that a particular input store is in the northeast region and is a high sales volume store for men's fashion, and therefore it is assigned to a certain assortment on this basis. Other stores located in different regions and/or having different sales volumes for the men's fashion category would be matched with similar stores and the results used to provide other proposed store-assortment assignments. In addition, this process may be performed for other categories besides men's fashion to create additional store-assortment assignments.

Figure 14A:
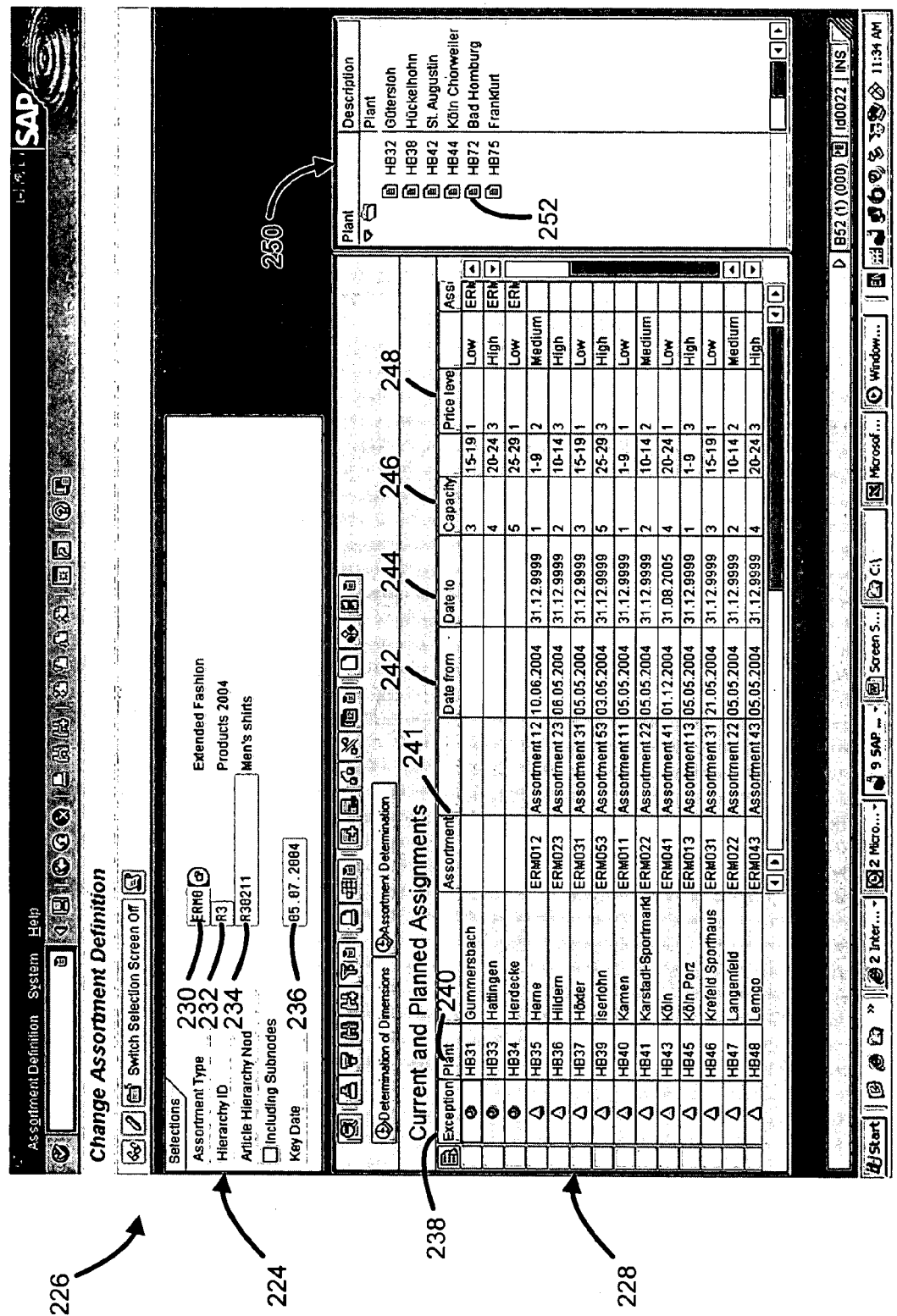
FIG. 14A shows an exemplary graphical user interface (GUI) for performing assortment definition including a header (upper) area, a table (lower left) area and a store selection (lower right) area.
Figure 14B:
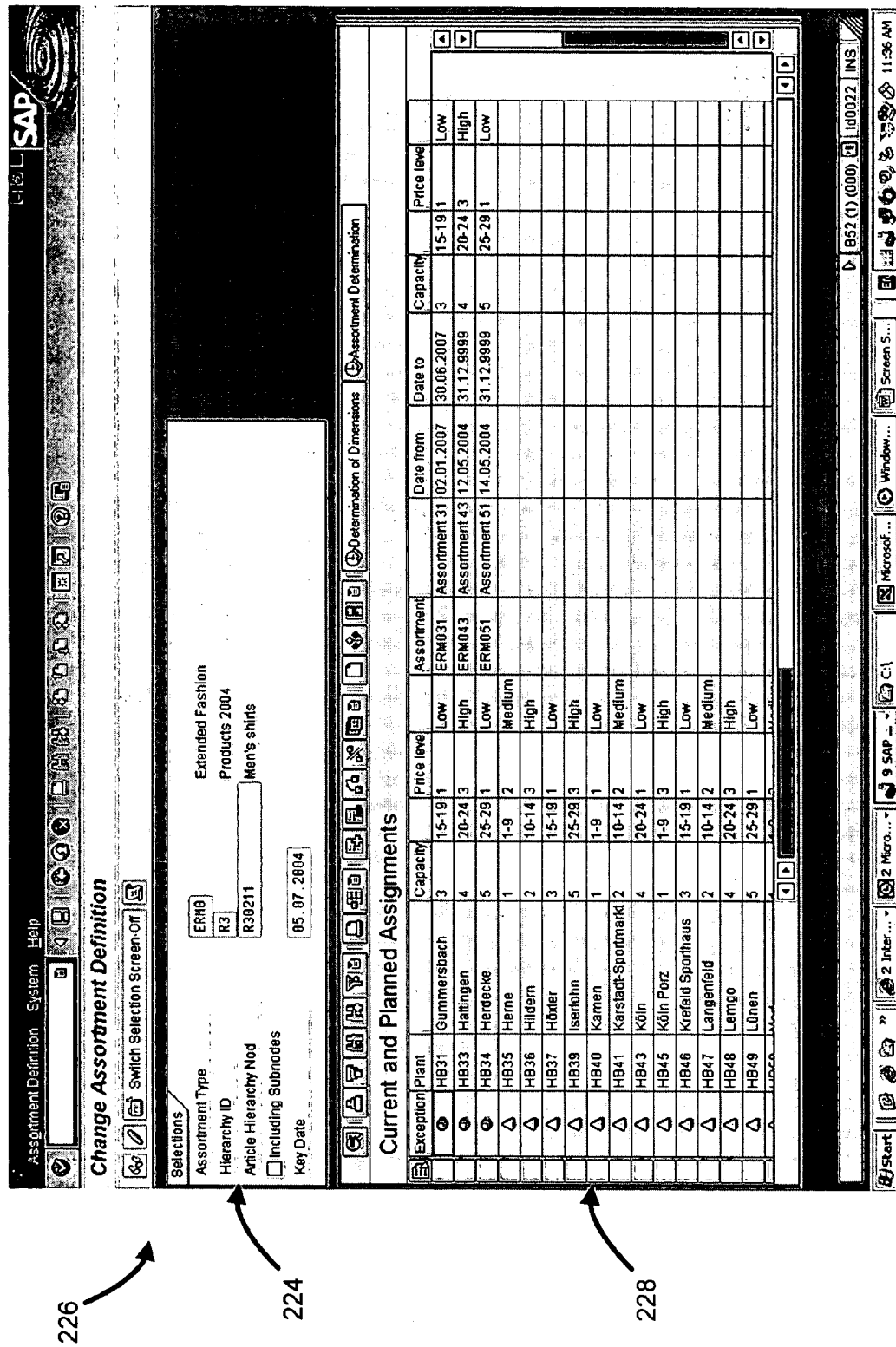
FIG. 14B shows the GUI of FIG. 14A with the store selection area turned off and the horizontal scroll bar in the table area moved to the far right to show additional columns.
Figure 14C:
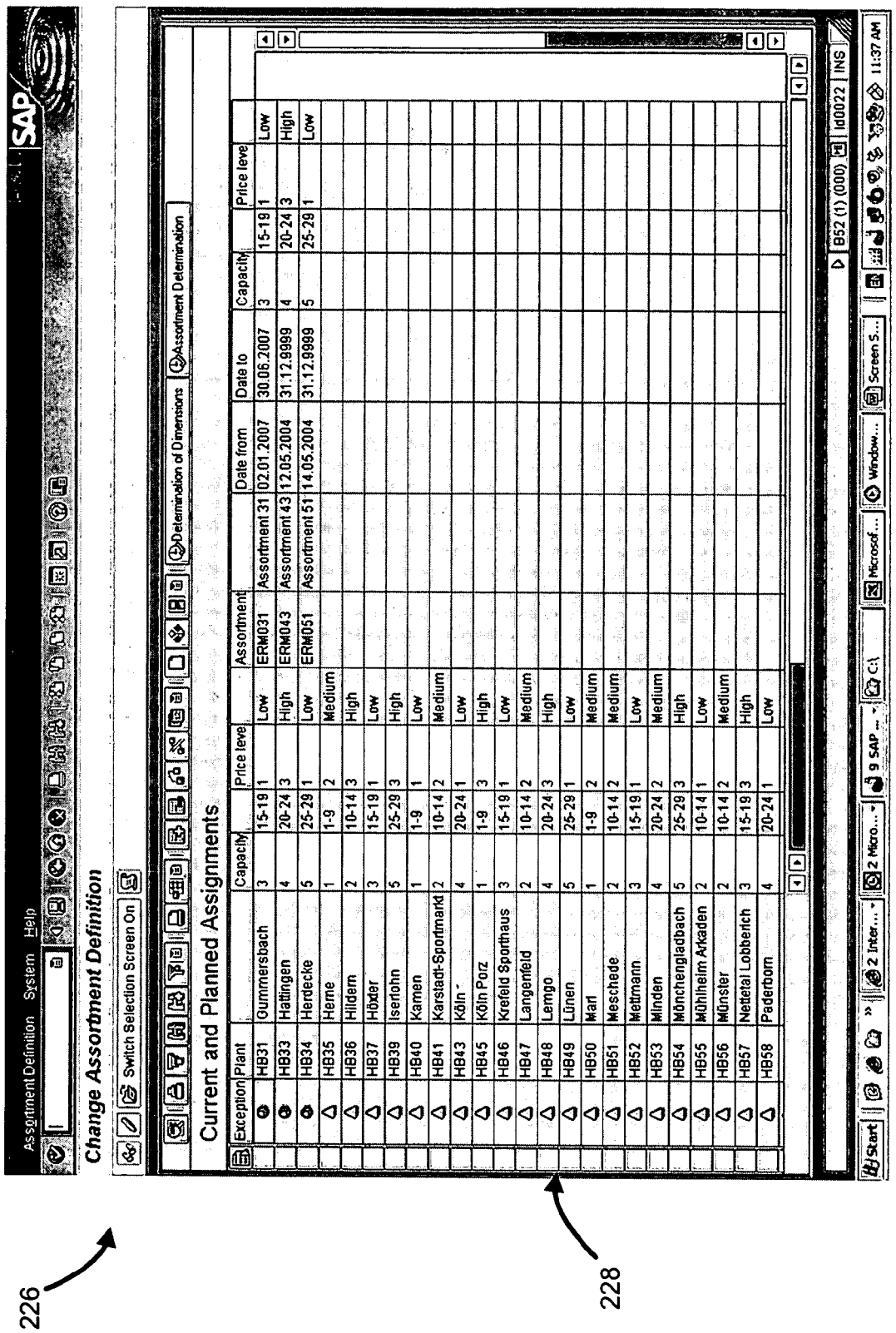
FIG. 14C shows the GUI of FIGS. 14A and 14B with the header area turned off to show additional rows of store assignments in the table area.

As persons skilled in the art will appreciate, the foregoing assortment decision process creates proposed store-assignment assortments that allow for more efficient assortment planning (i.e., matching the right articles with the rights stores at the right times). According to one embodiment, the proposed store-assortment assignments generated by process 154 may be presented to a user via an assortment definition graphical user interface (GUI) 224 such as shown in FIGS. 14A-14C and described below.

To further illustrate the concepts described above, an example of how assortment definition process 154 may be used to define an assortment of stores for a particular category of articles (e.g., handbags) is provided with reference to FIG. 11. In this example, the assortment creation process is graphically depicted using an assortment planning matrix that includes two dimensions, labeled: "Price Level" (vertical axis) and "Capacity" (horizontal axis). The assortment definition process may be initiated using this matrix by defining an assortment object for every meaningful combination of price level and capacity. For example, "Assortment35" may be defined and placed in square 172 to represent stores assigned with the classification price level of "3" (e.g., low price) and capacity of "5" (e.g., medium). In addition, Assortment35 may be assigned to the category "Handbags." In this example, Assortment35 may correspond to a shelf of a particular display rack of a particular layout module carrying low priced handbags for fashionable customers in medium capacity stores. This shelf is typically replanned regularly, and the temporal evolution is captured by the "assortment version" (or layout module version). Similar planning matrices may be created for each additional category of interest (e.g., suitcases, wallets, backpacks, etc.).

Next, stores may be assigned to the assortments (i.e., store clustering) using assortment definition process 154 described above. This is accomplished by analyzing, for every store, all historical sales data for handbags and classifying a capacity type according to the dimension definition. For example, if a particular input store has the capacity to display 100 handbags at a time, it might be classified as a type "5" store. According to an exemplary embodiment, this analysis may be performed automatically using automated classification engine 156 described above.

In addition to classifying each store by capacity, each store in the embodiment of FIG. 11 is also classified along the "price level" dimension. This may be done, for example, by getting feedback from store managers, cash register receipts, or demographic analysis provided by external companies. This information may be held in a store master database and be updated on a periodic but relatively infrequent basis, such as once per year.

The result of considering all stores using the process discussed above is assignments of stores to assortments, which may be used as inputs to an assortment definition engine (e.g., engine 166 in FIG. 9). According to an exemplary embodiment, the temporal validity of the store assignments is specified and proposals can be revised and released. The resulting configuration may be checked for consistency by the system without need for human input.

Referring again to the illustrated example, the stores assigned to Assortment35 represents a group of similar stores for which it is logical to carry a similar set of articles. This set of articles may be determined in a different step and assigned to Assortment35 to establish the desired article-assortment-store relation.

The assortment decision/planning process and system described above thus create new layout module versions which automatically become valid and later invalid after predetermined periods of time have elapsed and assigns articles (e.g., handbags) to this version according to the strategic target group (e.g., price level of "3"+capacity level of "5"). For example, an assortment layout module version may be defined to become valid after two months have elapsed and to become invalid after an additional two months have elapsed. After finalizing this plan, the layout module version is released, which means that the ordering process for the relevant articles is started (at least for those articles which are supplied by automatic replenishment).

Figure 12:
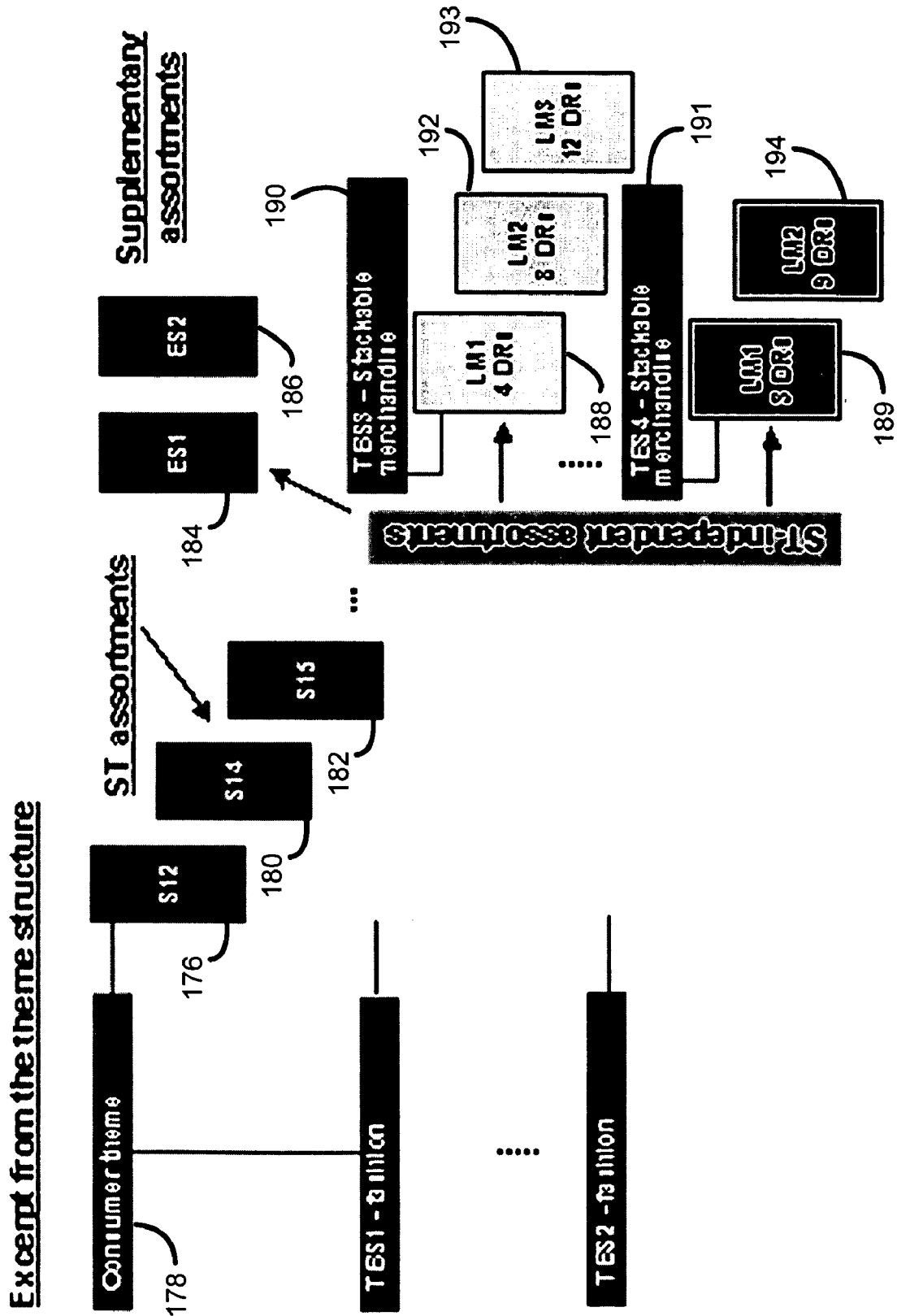
FIG. 12 is a diagram illustrating an excerpt of a theme structure including a plurality of standard assortments and a plurality of supplementary assortments.

As explained above, assortment planning for fashion merchandise and assortment planning for regular (e.g., non-fashion, stackable, basic, etc.) merchandise may be handled differently. For example, whereas the grouping—and thus the standardization—in assortment planning for fashion merchandise may be performed primarily using standard assortments from the business type definitions at the consumer theme level, the grouping for regular merchandise typically takes place at a deeper level in the theme structure, e.g., at or below the theme module. This difference is best illustrated in FIG. 12, which shows an excerpt of a theme structure 174. In theme structure 174, a standard (ST) assortment 176 comprising fashion merchandise is linked to a consumer theme (CT) node 178. Theme structure 174 further includes two additional ST assortments 180 and 182, which may be linked to other CT nodes (not shown) in theme structure 174 or to CT node 178 during consecutive time periods in the future. In addition to ST assortments 176, 180, 182, two supplementary assortments 184 and 186 comprising fashion merchandise are linked to one or more CT nodes (not shown).

As explained above, the assortments for regular merchandise are handled somewhat differently in the exemplary embodiment. In particular, assortments 188 and 189 comprising regular merchandise are linked to theme module (TM) level nodes 190 and 191, respectively. Moreover, two additional standard independent assortments 192 and 193 comprising regular merchandise may be assigned to one or more TM nodes (not shown) presently or to TM node 190 in the future. Similarly, another standard independent assortment 194 for regular merchandise may be assigned to another TM node (not shown) presently or assigned to TM node 191 in the future. As illustrated, each of the standard independent assortments 188, 189, 192, 193 and 194 for regular merchandise may comprise a layout module (LM), which in turn is defined by one or more display racks (DRs) of regular merchandise.

According to an exemplary embodiment, a store consumer theme is usually assigned to several assortments. Moreover, each store consumer theme typically has exactly one standard assortment (business type assortment), which is derived from the business type definition as described above. Because the standard assortment contains only fashion articles in this embodiment, business type assortments are not assigned any articles for consumer themes that have only regular merchandise theme modules. Instead, the regular merchandise articles are assigned to the store consumer theme via the assortments in the layout modules.

Figure 13:
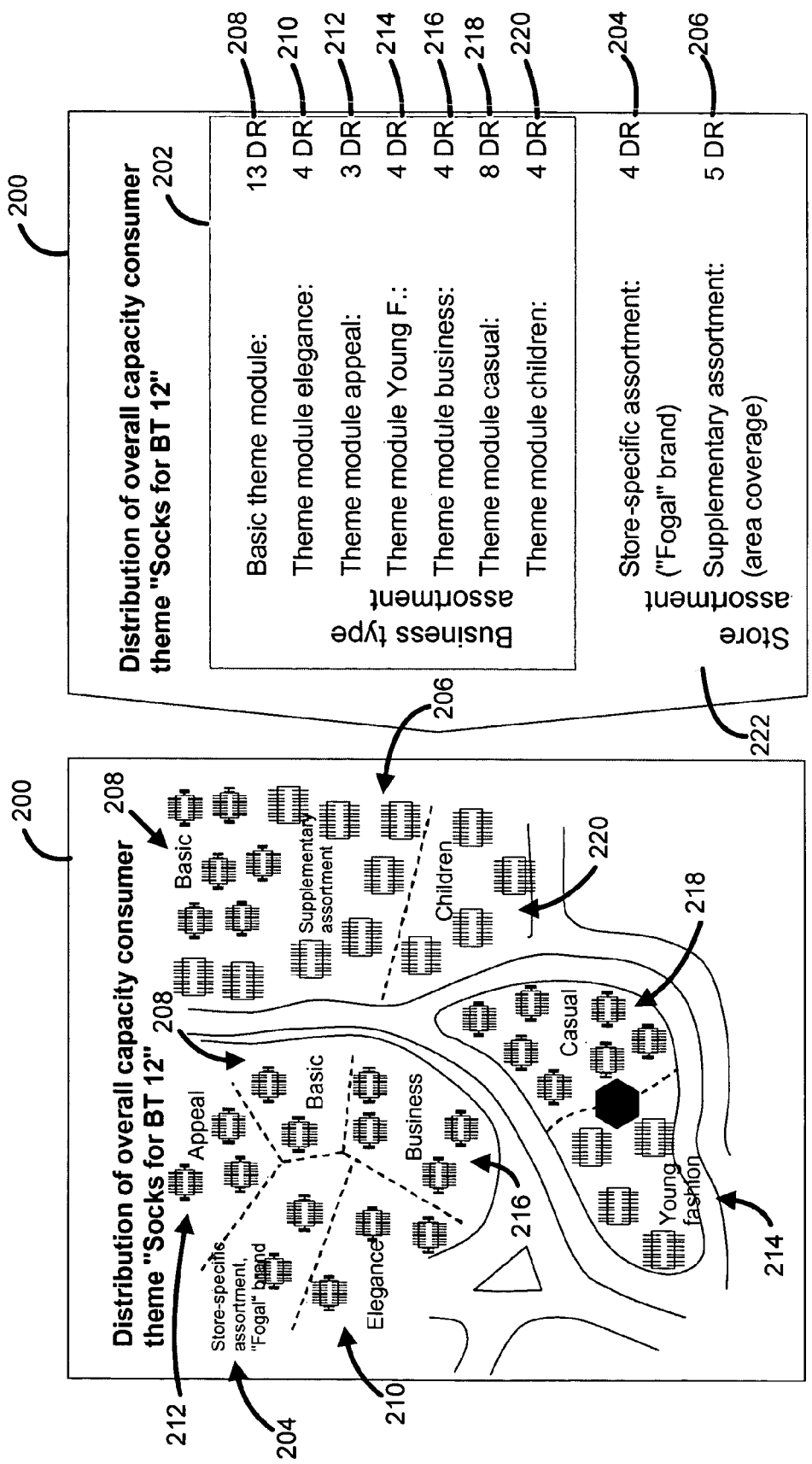
FIG. 13 is a diagram illustrating another example of a standard business type assortment and several store assortments assigned to particular consumer themes.

An illustration of the foregoing embodiment is illustrated in connection with FIG. 13. In this example, a consumer theme 200 identified as "Socks for BT 12" is linked to three assortments 202, 204 and 206. Assortment 202 is a standard assortment for fashion (i.e., a grouping of stores based on business type), which in turn contains links to a number of theme modules. In the illustrated embodiment, standard assortment 202 includes links to a basic theme module 208 along with specialized theme modules for elegance 210, appeal 212, young fashion 214, business fashion 216, casual dress 218, and children's clothing 220. Assortments 204 and 206 are both store assortments 222. In particular, store assortment 204 is a store-specified assortment for a particular brand (e.g., "Fogal") of products, while store assortment 206 is a supplementary assortment for area coverage (i.e., to fill gaps in a particular store or group of stores). The capacity of each assortment/sub-assortment is expressed in terms of a number of display racks (DRs).

According to an exemplary embodiment, the grouping of stores by business type is sufficient to provide for a large majority (e.g., 95% or more) of the assortment planning for the stores in each group as a whole. That is, the stores of an enterprise are preferably sufficiently uniform when grouped by business type (i.e., the same consumer theme/capacity/level) that most or all of the necessary assortment planning for these stores can be accomplished at the business type level. Then, the assortment planning necessary to link the remaining small amount of articles (e.g., 5% or less) to the right stores at the right times can be accomplished using supplementary store assortments. For example, the remaining articles can be assigned using supplementary (global) assortments (e.g., for store-specific brand management) based on store capacity or, in some cases, using supplementary (local) assortments (e.g., for flagship stores).

Referring now to FIGS. 14A-14C, a graphical user interface (GUI) 224 is illustrated for displaying, revising and approving store-assignment assortments, such as may generated by assortment definition process 154. In an exemplary embodiment, GUI 224 may be configured to perform one ore more of the following functions:

(i) Store dimension determination;
(ii) Automatic assortment assignment;
(iii) Add/change/delete new planned assortments;
(iv) Add/change/delete new planned assortment assignments;
(v) Master data display of store and assortment; and
(vi) Filtering/sorting/layout adjusting the list.

In the illustrated embodiment, GUI 224 includes a header area 226, a table area 228, and a store selection area 250. Header area 226 shows selection criteria for the assortments and the associated store assignments which may be revised. Header area 226 includes a plurality of selection criteria fields including an assortment type field 230, an article hierarchy ID field 232, an article hierarchy node (e.g., a category) field 234, and a validity (or key) date field 236. All assignments of stores to assortments that are valid at the date provided in field 234 are shown in table area 228 (discussed in detail below). In most cases, the validity date entered in field 234 is chosen to be in the future because assortment definition process 154 typically defines the store assignment configuration which should be valid for instances of the next year.

Based on selection data entered into header area 290, all of the actual (i.e., current) and planned assignments of stores to assortments are presented in table area 228. In the illustrated embodiment, table area 228 includes an exception column 238, a plant (or store) column 240, an assortment column 241, a date from column 242, a date to column 244, a capacity type column 246, and a price level type column 248.

Exception column 238 shows the status of each assignment of a store to an assortment. Green indicates an assignment that has already been released to an operative execution system, i.e., the store-assortment assignment is actually in use. Yellow indicates an assignment that has been planned but not yet released. Red indicates an assignment that is incomplete. Assignments that are planned are not visible "outside" the planning system. After a planned assortment is approved and released to operative systems, it receives the status released and the yellow light in column 238 is replaced by a green light. From a planning standpoint, it may be important to know whether the assignments are already used operatively because, if so, changes should be limited. In the illustrated embodiment, operative (e.g., "actual") assignments are shown in the left side columns of table area. If an operative assortment is being replaced by a new (planned) assignment, the new (planned) assignment is shown in the same row in the far right hand columns (see FIGS. 14B and 14C).

Continuing with the description of table area 228, store column 240 shows the stores, including the technical name (e.g., unique ID) and the associated description. Assortment column 241 shows the actual/planned/incomplete assortment, including the technical name (e.g., unique ID) and the associated description. Date from column 242 and date to column 244 show the validity period for the assignment. Capacity column 246 shows the capacity type of the store, and price level column 248 shows the price level type of the store.

In the illustrated embodiment, GUI 224 may includes a plurality of buttons which may be selected (e.g., by clicking with a mouse) to invoke various functions associated with assortment definition. For example, GUI 224 may include a "Find Assortments" button that may be selected to launch the store matching process and (potentially) propose a new assortment for each store. If this proposal is found acceptable to the user and accepted, a new (planned) assortment is created and the old assignment is terminated.

Store selection area 250 shows all of the stores that match the selection criteria entered into fields 230-236 in header area 224 but have not yet been assigned to an assortment. In an exemplary embodiment, store selection area 250 includes a tree structure 252 that includes all of the eligible stores. In this embodiment, the stores may be dragged from tree 252 and dropped onto an assortment in table area 228 to create a new assignment manually.

Figure 15:
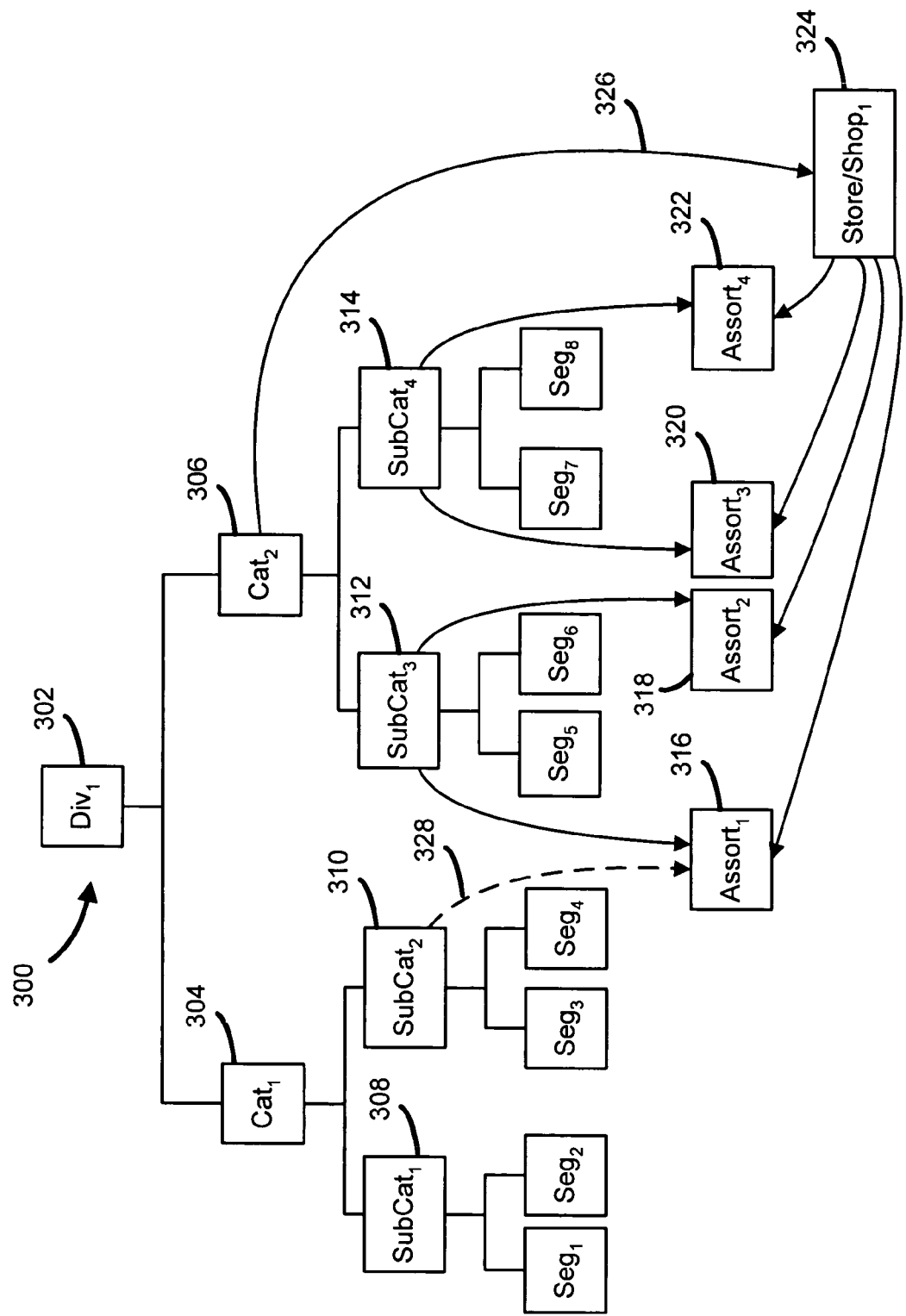
FIG. 15 shows an exemplary view of an article hierarchy having various nodes therein assigned to assortments and another node in the hierarchy assigned to a store as a check on the products that are assignable to the assortment and thus the store.

With reference now to FIG. 15, an exemplary embodiment of an assortment definition/planning system for restricting the assignment of certain types of products to particular stores is shown and described. In FIG. 15, an article hierarchy 300 is illustrated with a structure such as described above with reference to article hierarchy 18 in FIG. 1. In particular, an uppermost division level node 302 is shown linked to a pair of category level nodes 304 and 306, each of which is shown linked to a pair of subcategory nodes 308, 310, 312, 314. More specifically, category node 304 is shown linked to subcategory nodes 308 and 310, while category node 306 is shown linked to subcategory nodes 312 and 314. In turn, each subcategory node 308, 310, 312 and 314 is shown linked to a number of segment nodes. It will be understood that each segment node may be linked to one or more generic articles or article variants (not shown in FIG. 15). It will also be understood that the particular structure of hierarchy 300 shown in FIG. 15 is merely exemplary and that more or fewer levels could be used, as well as different names for the various levels.

As described above, one or more nodes in hierarchy 300 may be assigned (or linked) to an assortment for purposes of assigning a group of products to that assortment (and thus the stores in that assortment) during assortment planning. For example, subcategory node 312 may be assigned to a pair of assortments 316 and 318 to provide a group assignment of the products under node 312 to assortments 316 and 318. It may be desirable to assign a single node to two assortments, for example, when assortment 316 is for small stores and assortment 318 is for large stores. As another example, subcategory node 314 may be assigned to a pair of assortments 320 (for small stores) and 322 (for large stores) to assign the products under node 314 to assortments 320 and 322. After each of the foregoing assignments of a subcategory node to an assortment, is made, one or more products beneath the subcategory node may be excluded (e.g., using a suitable GUI) from the assortment as explained above. Although not illustrated in FIG. 15, nodes above or below the subcategory level could also (or alternatively) be assigned to the assortments.

In addition to the assignments of products to assortments, it is also necessary to assign stores to the assortments so that the desired products are provided to the correct stores at the proper times. Typically, the assignment of the stores to the assortments is performed prior to assigning the products to the assortments using an assortment definition process such as described above in detail. In FIG. 15, a store (or shop) 324 is shown as having already been assigned to assortments 316, 318, 320 and 322.

In an exemplary embodiment, an additional link can be established to create a check or restriction on the types of products that are assignable to a particular store during assortment planning. More specifically, a particular node at one level (e.g., a category level) in an article hierarchy may be assigned to a store to indicate that only products below that node are assignable to that store. In FIG. 15, for example, a link 326 can be established between category node 306 and store node 324 to restrict the types of products that are assignable to store 324 to only those products below node 306. Thus, while the assignment of subcategory 312 to assortment 316 is permissible, the assignment of subcategory 310 to assortment 316 is not permissible (as indicated by a dashed line 328). The assortment planning system may be configured so that any impermissible assignments are completely prevented by the system. Alternatively, the impermissible assignments may simply flagged to users as possible errors in the system but allowed to exist. As yet another possibility, impermissible assignments may be overridden manually, but only when appropriate supervisory approval is given (e.g., by entry of certain passwords).

As persons skilled in the art will recognize, a restriction or check such as described above with reference to FIG. 15 may be particularly beneficial in the context of department stores. For example, if category nodes 304 and 306 represent women's fashion and men's fashion, respectively, and store 324 represents a men's wear shop in a department store, then it may be desirable to establish a link between category node 306 and store 324. When this assignment is made, any attempt to assign women's fashion products to store 324 during assortment planning would be flagged as impermissible.

As noted above, embodiments within the scope of the present invention include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions comprise, for example, instructions and data which cause a general purpose computer, special purpose computer, or special purpose processing device to perform a certain function or group of functions.

In some embodiments, the present invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

The present invention in some embodiments, may be operated in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and web implementations of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

It is important to note that the above-described preferred and alternative embodiments of the present invention are illustrative only. Although the invention has been described in conjunction with specific embodiments thereof, those skilled in the art will appreciate that numerous modifications are possible without materially departing from the novel teachings and advantages of the subject matter described herein. For example, although the stores in FIG. 8 above are illustrated and described as being linked directly to the assortments, the assignment could be via assortment versions as with the products. Similarly, the assortment versions used for linking the products to the assortments could be eliminated and instead the products linked directly to the assortments. As another example, the articles described in the foregoing exemplary embodiments could be pre-packed articles that comprise standard collections of sizes and/or colors or other variants of each article. Accordingly, these and all other such modifications are intended to be included within the scope of the present invention. Other substitutions, modifications, changes and omissions may be made in the design, operating conditions and arrangement of the preferred and other exemplary embodiments without departing from the spirit of the present invention.

What is claimed is:

1. A computer-implemented method of planning an assortment, comprising:
   creating, via a computer, a plurality of assortment versions and a plurality of store definitions that include a plurality of assortment dimensions including a price level type, a capacity type and a merchandise grouping;
     wherein the price level type has been assigned to designate a store price level as one of high-priced, mid-priced, low-priced or flagship store,
     wherein the capacity type has been assigned to designate a store capacity as one of extra small, small, medium, large or extra large,
     wherein the merchandise grouping has been assigned to classify a store based on at least one of geography, climactic zone, demographic or retail concept;
   assigning, using a processor, a first article to a first assortment version of the plurality of assortment versions;
   assigning, using the processor, a first validity period to the first assortment version of the plurality of assortment versions which defines a first time period during which the first article is in the assortment via the first assortment version; and
   assigning, using the processor, a first plurality of stores to the assortment by matching the price level type, the capacity type and the merchandise grouping dimensions of the first assortment version of the plurality of assortment versions with the plurality of store definitions;
   assigning, using the processor, a store assignment time period for each store in the first and second plurality of stores during which the assignment of the each store in the first and second plurality of stores to the assortment is active.

2. The method of claim 1, further including assigning a second article to the assortment via the first assortment version, whereby the second article is in the assortment during the first time period via the first assortment version.

3. The method of claim 1, further comprising assigning, using the processor, a second article to a second assortment version and a second validity period to the second assortment version to define a second time period during which the second article is in the assortment via the second assortment version.

4. The method of claim 1, wherein the first time period is defined by a starting time and an ending time.

5. The method of claim 1, wherein a store of the first plurality of stores is assigned directly to the assortment.

6. The method of claim 1, further including:
defining a second temporary period during which at least one store of the first and second plurality of stores will be assigned to a second assortment version.

7. The method of claim 6, wherein first time period and second temporary period are the same.

8. The method of claim 6, wherein first time period and second temporary period are different.

9. Computer-readable storage media storing a program product for planning an assortment, the program product comprising machine-readable program code for causing, when executed, one or more machines to perform the following steps:
creating, via a computer, a plurality of assortment versions and a plurality of store definitions that include a plurality of assortment dimensions including a price level type, a capacity type and a merchandise grouping;
wherein the price level type has been assigned to designate a store price level as one of high-priced, mid-priced, low-priced or flagship store,
wherein the capacity type has been assigned to designate a store capacity as one of extra small, small, medium, large or extra large,
wherein the merchandise grouping has been assigned to classify a store based on at least one of geography, climactic zone, demographic or retail concept;
assigning, using a processor, a first article to a first assortment version of the plurality of assortment versions;
assigning, using the processor, a first validity period to the first assortment version of the plurality of assortment versions which defines a first time period during which the first article is in the assortment via the first assortment version; and
assigning, using the processor, a first plurality of stores to the assortment by matching the price level type, the capacity type and the merchandise grouping dimensions of the first assortment version of the plurality of assortment versions with the plurality of store definitions;
assigning, using the processor, a store assignment time period for each store in the first and second plurality of stores during which the assignment of the each store in the first and second plurality of stores to the assortment is active.

10. The computer-readable storage media of claim 9, wherein the steps further comprise assigning a second article to the assortment via the first assortment version, whereby the second article is in the assortment during the first time period via the first assortment version.

11. The computer-readable storage media of claim 9, further comprising assigning, using the processor, a second article to a second assortment version and a second validity period to the second assortment version to define a second time period during which the second article is in the assortment via the second assortment version.

12. The computer-readable storage media of claim 9, wherein the first time period is defined by a starting time and an ending time.

13. The computer-readable storage media of claim 9, wherein a store of the first plurality of stores is assigned directly to the assortment.

14. The computer-readable storage media of claim 9, wherein the steps further comprise:
defining a second temporary period during which at least one store of the first and second plurality of stores will be assigned to a second assortment version.

15. The computer-readable storage media of claim 14, wherein first time period and second temporary period are the same.

16. The computer-readable storage media of claim 14, wherein first time period and second temporary period are different.

17. The method of claim 1, wherein the second temporary period and the first time period are at least partially nonoverlapping.

18. The method of claim 1, wherein the second temporary period is defined such that at least one store remains in the assortment from a start time to a time not earlier than a time at which the assortment is canceled.

* * * * *